US010192580B1

United States Patent
Liu et al.

(10) Patent No.: US 10,192,580 B1
(45) Date of Patent: Jan. 29, 2019

(54) WRITE CURRENT SWITCHING IN A DATA STORAGE DEVICE USING AN EFFECTIVE FOOTPRINT OF A WRITE POLE

(71) Applicant: Seagate Technology LLC, Cupertino, CA (US)

(72) Inventors: Xiong Liu, Singapore (SG); Quan Li, Singapore (SG); Ralph William Cross, Lyons, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/971,284

(22) Filed: May 4, 2018

(51) Int. Cl.
| G11B 15/02 | (2006.01) |
| G11B 11/105 | (2006.01) |
| G11B 20/10 | (2006.01) |
| G11B 5/09 | (2006.01) |
| G11B 5/012 | (2006.01) |

(52) U.S. Cl.
CPC ........ *G11B 20/10222* (2013.01); *G11B 5/012* (2013.01); *G11B 5/09* (2013.01); *G11B 20/10037* (2013.01)

(58) Field of Classification Search
CPC ....... G11B 5/09; G11B 5/012; G11B 20/1217; G11B 20/10009; G11B 2005/0021; G11B 5/6047; G11B 20/12; G11B 11/10508
See application file for complete search history.

(56) References Cited

U.S. PATENT DOCUMENTS

| 5,721,856 | A | 2/1998 | Takeuchi |
| 6,466,386 | B1 | 10/2002 | Dakroub |
| 6,798,591 | B2 | 9/2004 | Barnett et al. |
| 6,879,455 | B2 | 4/2005 | Ngo et al. |
| 7,035,028 | B2 | 4/2006 | Venca et al. |
| 7,117,817 | B2 | 10/2006 | Overstreet |
| 7,206,155 | B2 | 4/2007 | Kuehlwein et al. |
| 7,242,544 | B2 | 7/2007 | Price, Jr. et al. |
| 7,290,184 | B2 | 10/2007 | Bruner et al. |
| 8,804,261 | B2 | 8/2014 | Mazur et al. |
| 9,715,887 | B2 * | 7/2017 | Wilson ............ G11B 20/10027 |
| 9,905,251 | B2 | 2/2018 | Liu et al. |
| 2012/0019947 | A1 | 1/2012 | Kuehlwein et al. |
| 2017/0236534 | A1 | 8/2017 | Liu et al. |

* cited by examiner

*Primary Examiner* — Nabil Z Hindi
(74) *Attorney, Agent, or Firm* — Hollingsworth Davis, LLC

(57) ABSTRACT

A sequence of symbols is generated to describe a set of write data, the symbols having a length of nT, where T is a channel clock rate and n is an integer over a predetermined range. Bi-directional write currents are applied to a write pole to record the sequence of symbols to a magnetic storage medium. The write pole has an effective footprint with a downtrack length of mT, where m is an integer. The write currents are switched between a first rail current and a second rail current for alternating symbols, the write currents further transitioning to an intermediate current value for at least one channel clock period for symbols longer than 1T. Write currents are applied to the write pole when recording symbols having a length longer than mT using the effective footprint of the write pole as an interval.

20 Claims, 13 Drawing Sheets

WRITE CURRENT SWITCHING IN A DATA STORAGE DEVICE USING AN EFFECTIVE FOOTPRINT OF A WRITE POLE

SUMMARY

Embodiments are directed to a method comprising generating a sequence of symbols to describe a set of write data, the symbols having a length of nT, where T is a channel clock rate and n is an integer over a predetermined range. The method comprises applying bi-directional write currents to a write pole to record the sequence of symbols to a magnetic storage medium. The write pole has an effective footprint with a downtrack length of mT, where m is an integer. The write currents are switched between a first rail current and a second rail current for alternating symbols, the write currents further transitioning to an intermediate current value for at least one channel clock period for symbols longer than 1T. The method also comprises applying write currents to the write pole when recording symbols having a length longer than mT using the effective footprint of the write pole as an interval.

Embodiments are directed to an apparatus comprising a magnetic recording medium and a write pole controllably positionable adjacent the medium to write data thereto. The write pole has an effective footprint with a downtrack length of mT, where m is an integer. A channel circuit is configured to generate a sequence of symbols having a length of nT, where T is a channel clock rate and n is an integer over a predetermined range. A write driver is configured to apply bi-directional write currents to the write pole to record the sequence of symbols to the medium. The write currents are switched between a first rail current and a second rail current for alternating symbols. The write currents also transition to an intermediate current value between the first and second rail currents for at least one channel clock period for symbols longer than 1T. The writer driver is further configured to use the effective footprint of the write pole as an interval for applying write currents to the write pole when recording symbols having a length longer than mT to the medium.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
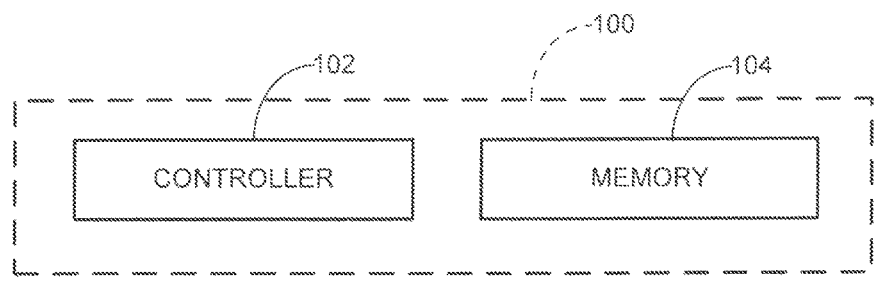
FIG. 1 is a simplified functional block diagram of a data storage device configured and operated in accordance with various embodiments of the present disclosure.

The present disclosure is generally directed to data storage systems, and more particularly to a method and apparatus for enhancing write current switching efficiencies during data write operations.

Data storage devices store and retrieve data from a host device in a fast and efficient manner. Some data storage devices employ rotatable recording media (discs) which are rotated at a high rotational velocity. One or more data transducers (heads) are movably positioned adjacent tracks defined on the disc surfaces to write and read data to and from the media.

The data are often written in the form of symbols of nT bit length, where T is a channel clock rate and n is an integer over a selected range. For example, 1T refers to 1 bit of a particular polarity, 2T refers to 2 bits with the same polarity, 3T refers to 3 bits with the same polarity, and so on. The range for the value n can vary depending on the requirements of a given storage device environment. Representative ranges can include symbol lengths of from 1T to 8T, 3T to 16T, etc.

In magnetic recording discs, bi-directional write currents are supplied to a write coil to write the symbol sequence to the medium, with magnetic flux transitions (reversals) being supplied at each symbol boundary. The magnetic flux transitions are interpreted as a first logical value (e.g., logical 1), and a second logical value (e.g., logical 0) is assigned to each of the channel bits between adjacent symbol boundaries.

Run length limited (RLL) encoding (e.g. 8/9, 16/17, etc.) is applied to establish the available symbol set by incorporating rules with regard to how closely spaced and how far apart the symbol boundaries (e.g., logical 1s) can be located in the recorded sequence. For example, a symbol set with a minimum symbol length of 1T allows transitions (logical 1s) to be immediately adjacent one another with no intervening logical 0s therebetween (e.g., the sequence "11" can be written to the medium). By contrast, a symbol set with a minimum symbol length of 2T requires at least two (2) logical 0s be present between successive logical 1s (e.g., 1001 is the closest two logical 1s can appear on the medium). A symbol set with a maximum symbol size of 8T allows no more than eight (8) logical 0s between successive logical 1s (e.g., 100000001 is the maximum distance between logical 1s), and so on.

Increasing the data storage density along a track (such as in terms of bits per inch, or BPI) can generally be achieved by increasing the effective channel clock rate T. The channel clock rate T can be increased by using a higher write frequency clock and/or rotating the medium at a higher rotational velocity. Generally, a higher channel clock rate T provides a shorter amount of elapsed time between successive transitions on the medium as the medium rotates adjacent the associated transducer.

There will generally be an upper limit to how short the smallest symbols in the symbol set can be from an elapsed time and distance standpoint. For example, the use of extremely short symbols in the symbol set, such as 1T symbols, can provide degradation in the reliability of the write operation if there is insufficient time for the write driver to obtain a full reversal of the write current through the coil during the period of time that the 1T (or other short length) symbol is being written. Stated another way, the shortest symbols in the set may not be "long" enough from a time or distance standpoint to enable the system to adequately magnetize the medium and store the desired magnetization pattern with sufficient strength to ensure reliable recovery during a subsequent read operation.

A related issue is that for longer symbol lengths (e.g., 5T, 8T, 12T, etc.), adjacent track erasure can arise, thereby limiting track per inch (TPI) densities that can be achieved. That is, longer symbol lengths may tend to provide radially "wider" symbols as compared to shorter symbol lengths due to the extended application of power from the write pole to the medium.

Thus, using a reduced frequency channel clock rate T to accommodate short symbol writes may tend to increase adjacent track interference and serve as an upper limit on achievable TPI densities. The foregoing limitations are not limited to magnetic recording, but can arise in other data recording systems as well such as optical data recording systems that rely on changes in optical detection levels to mark symbol boundaries.

Accordingly, various embodiments of the present disclosure are generally directed to a method and apparatus for writing data to a data recording medium. Various embodiments are directed to measuring an effective footprint of a write pole (referred to herein as the effective write pole footprint or EWPF). Various embodiments are directed to applying write currents to a write pole according to both the data pattern to be written and the effective write pole footprint. Applying write currents to a write pole according to both the data pattern to be written and the effective write pole footprint advantageously reduces the risk of adjacent track erasure and power consumption when writing relatively long data patterns (e.g., symbols having a length>5T or 6T).

As explained below, various embodiments provide a write driver circuit that supplies bi-directional write currents to a write pole, such as but not limited to a magnetic coil. Data are written in the form of a sequence of nT symbols over a selected range, where T is a channel clock rate and n is an integer such as from a minimum value for n=X to a maximum value for n=Y. Alternating symbols are written using opposing rail currents of selected respective magnitudes.

For symbols having a length>1T, an intermediate current value (e.g., 0 mA) between the two rail current magnitudes is applied to the write pole for one or more channel clock periods prior to the next transition (symbol boundary). The number of channel clock periods during which the intermediate current value is applied is based on the length of the symbol and the effective footprint of the write pole. The intermediate current can be a zero current or a relatively small current. In this way, the current switching time to initiate the writing of the next symbol can be reduced. This can be achieved in a variety of ways, such as by adding a zero status to the data stream or temporarily disabling the write current at the end of each symbol.

The size of the effective write pole footprint corresponds to the number of bits that are concurrently magnetized to the desired magnetization orientation when a write current is applied to the write pole. For example, a write pole with an effective footprint of 6T will concurrently magnetize 6 bits to the desired magnetization orientation when a write current is applied to the write pole.

The effective write pole footprint and the length of the symbol to be written are used to determine when and how long the write current is to be applied to the write pole. According to some embodiments, and as described in detail hereinbelow, the effective write pole footprint is measured in terms of downtrack bit length, expressed in terms of a downtrack length of mT symbol bits, where m is an integer. For example, the effective footprint for a typical write pole can be 5T, 6T, 7T or 8T long, for example. It will be understood that the effective write pole footprint size can be smaller or larger than this representative range. As will be discussed below, the size of the effective write pole footprint will vary from write pole to write pole (e.g., head to head). Moreover, the size of the effective write pole footprint will vary across the stroke as a function of skew between the outer diameter (OD) and the inner diameter (ID) of the disc.

In accordance with various embodiments, the timing and duration of write currents applied to the write pole when writing data patterns of varying length can be implemented as follows:

Length of 1T: apply write current using a first write scheme

Length of 2T to the EWPF: apply write current using a second write scheme

Length>EWPF: apply write current using a third write scheme

As can be seen above, different writing schemes are implemented based on the relationship between the length of the data pattern to be written and the effective write pole footprint.

According to some embodiments, the following writing schemes can be implemented based on the effective write pole footprint and the length T of the data pattern to be written. For a 1T data pattern, the first scheme involves applying a write current for the $1^{st}$ T. For a data pattern having a length from 2T to the EWPF, a write current is applied only for the $1^{st}$ T. No current (or an intermediate current) is applied after the $1^{st}$ T for a data pattern having a length from 2T to the EWPF. For a data pattern having a length>EWPF, the EWPF is used as an interval for applying write currents, details of which are provided hereinbelow. In general terms, for a data pattern having a length>EWPF, no current (or an intermediate current) is applied for the last m−1 bits of the data pattern, where mT represents the effective write pole footprint.

While it is contemplated that the rail current magnitudes will be equal and opposite values, such as nominally ±25 milliamps, mA, such is not required. Depending on the type of medium and the write characteristics of the write pole, the rail current magnitudes can be any suitable values including values with different magnitudes (e.g., +30 mA and −20 mA). Similarly, while a zero current value can be used for the intermediate level, other values of relatively small current can be applied, including intermediate values that are selected based on factors such as the size of a given symbol and/or the direction of the switching current.

It has been found by the inventors that write power wave shaping using the effective write pole footprint and intermediate current values in accordance with various embodiments disclosed herein can provide a substantial reduction of adjacent track erasure effects and power consumption. Adjacent track erasure generally involves the partial erasure of the data stored on an adjacent track. Adjacent track erasure arises due to the application of write current to a target track; the larger the write current, generally the wider the adjacent track erasure, and the longer the write current is applied, generally the wider the adjacent track erasure. Since zero or small current is applied to the writing of some bits, the adjacent track erasure can be reduced. This in turn allows further reductions in track pitch and higher TPI values.

The techniques disclosed herein can be applied to any number of different forms of recording systems, including but not limited to perpendicular magnetic recording (PMR), longitudinal magnetic recording (LMR), heat assisted magnetic recording (HAMR), microwave assisted magnetic recording (MAMR), two dimensional magnetic recording (TDMR), shingled magnetic recording (SMR), interleaved magnetic recording (IMR), etc. The write currents as discussed herein can be supplied to magnetically responsive writer elements (e.g., magnetic write coils) as well as other forms of write devices such as, for example, a laser diode used in a HAMR system, an optical or magneto/optical system, etc.

These and other features of various embodiments of the present disclosure can be understood beginning with a review of FIG. 1 which provides a simplified representation of a data storage device 100 of the type used to store and retrieve user data from a host device. The device 100 includes a controller (control circuit) 102 and a memory module 104. The controller 102 provides top level communication and control functions as the device interfaces with the host device. Data from the host device is transferred for storage in the memory 104.

In some cases, the controller 102 can take the form of a hardware or programmable processor with associated programming in a memory location to carry out the requisite control functions. The memory 104 can take any number of configurations to provide non-volatile storage of data, including but not limited to magnetic recording discs, optical recording discs, etc. The memory 104 may include circuitry in the form of channel electronics, preamplifier/driver stages, spindle and actuation motors, etc.

Figure 2:
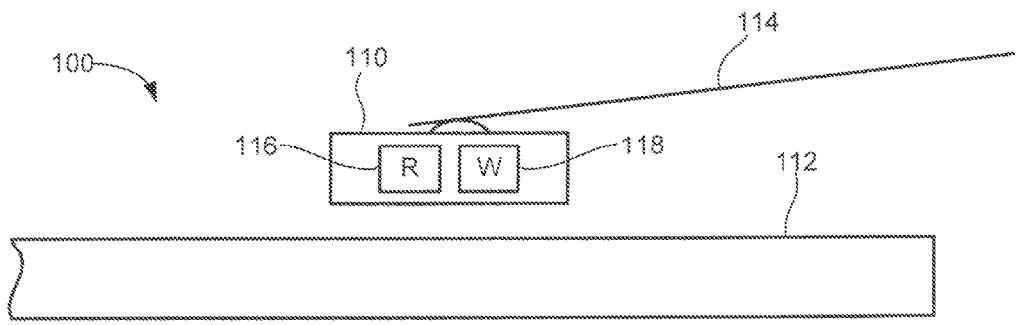
FIG. 2 shows a data transducer adjacent a data recording medium in accordance with some embodiments of the data storage device of FIG. 1.

FIG. 2 shows an elevational representation of a data transducer 110 of the data storage device 100 of FIG. 1 in accordance with some embodiments. In FIG. 2, the storage device 100 is characterized as a hard disc drive (HDD), although such is merely for purposes of providing a concrete example and is not limiting. The techniques disclosed herein are applicable to a wide variety of data storage devices including hybrid drives, optical storage devices, magneto-optical storage devices, etc.

The data transducer 110 is controllably positioned adjacent a magnetic recording medium (disc) 112 using a flexible suspension (flexure) member 114. In some cases, an air bearing surface (ABS) may be formed on a slider portion of the transducer to maintain stable aerodynamic flight of the transducer using fluidic atmospheric currents established by the high speed rotation of the disc 112.

The data transducer 110 (also referred to as a "head") includes a number of operative elements including a read (R) element 116 and a write (W) element 118. The read element may take the form of a magnetoresistive (MR) sensor, and the write pole may take the form of a perpendicular magnetic writing coil. Other forms for these elements can be used as desired. Additional operative elements can be incorporated into the transducer 110 such as a heat assisted magnetic recording (HAMR) system, a fly height adjustment (FHA) mechanism, contact sensors, etc.

Figure 3:
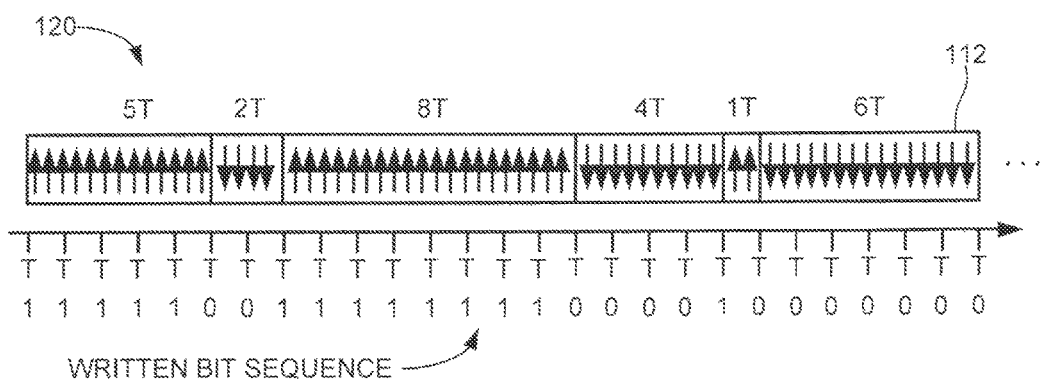
FIG. 3 represents a representative magnetization pattern for the medium of FIG. 2.

FIG. 3 shows a magnetization pattern 120 that is written by the write pole 118 to a recording layer of the medium 112 from FIG. 2 during a write operation. A perpendicular magnetic recording pattern is shown, although such is merely exemplary and is not limiting. The perpendicular magnetization direction is vertical, or perpendicular, to the top surface of the medium 112, and constitutes a sequence of symbols of alternating magnetic orientation.

The pattern 120 is written as a sequence of symbols with lengths nT where T is a channel clock rate at a selected frequency and n is an integer which ranges over a selected interval set from a minimum value X to a maximum value Y. For purposes of the present discussion, the encoding scheme is contemplated as providing symbols of from 1T to 8T in length. Other encoding schemes can be used. FIG. 3 shows an exemplary symbol sequence of 5T, 2T, 8T, 4T, 1T and 6T symbols that have been written to the medium 112. For the pattern 120, the 5T symbol is interpreted as the bit pattern 11111, the 2T symbol is interpreted as the bit pattern 00, and so on. The number of arrows representing each symbol is not significant other than to denote an exemplary magnetic orientation for that particular region of the medium 112.

Figure 4:
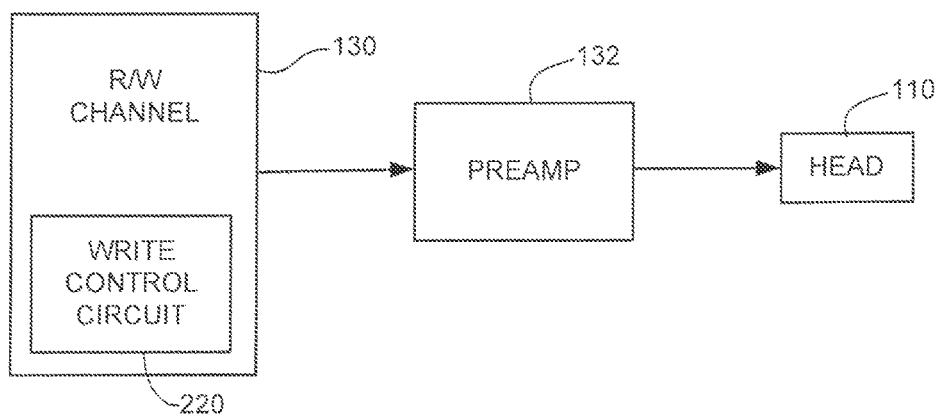
FIG. 4 is a functional block diagram of the data transducer (head) from FIG. 2 in conjunction with a read/write (R/W) channel and a preamplifier/driver (preamp) circuit of a representative data storage device in accordance with various embodiments.

FIG. 4 shows the transducer (head) 110 of FIG. 2 in conjunction with a read/write (R/E) channel circuit 130 and a preamplifier/driver circuit (preamp) 132. The channel 130 can be realized in a number of different hardware or programmable processor configurations, including SOC (system on chip) integrated circuit devices, programmable devices that use programming in memory to execute program steps, state machines, hardwired logic gates, transistors, etc. Regardless of form, the channel circuit includes encoding circuitry used during write operations to transition input write data to a sequence of symbols. The channel 130 further includes decoding circuitry used during read operations that reconstructs the originally written data from a recovered bit sequence corresponding to the originally written symbols. The preamp 132 includes write driver and read amplification and conditioning circuitry to interface with the transducer 110.

During a read operation, a readback signal is generated by the read sensor 116 (FIG. 2). The pulses are used to adjust a variable clock oscillator (VCO) or similar circuit in the channel 130 to establish a readback clock that provides search windows at each T interval. In this way, the bit sequence shown in FIG. 3 can be recovered by the channel and decoded to provide the originally stored user data sequence.

Figure 5:
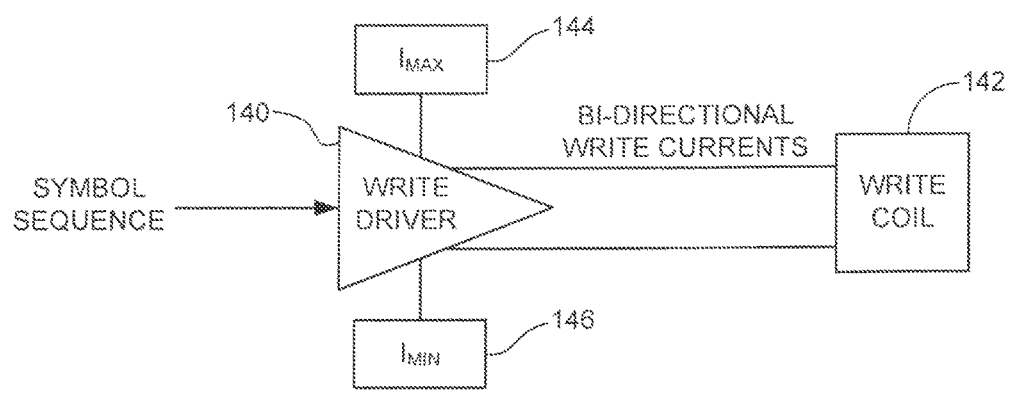
FIG. 5 shows a write driver circuit of the preamp shown in FIG. 4 in conjunction with a write coil of the transducer in accordance with various embodiments.

FIG. 5 shows a write driver circuit 140 of the preamp 132 of FIG. 4. The write driver circuit 140 can take any number of suitable forms, including an H-bridge circuit made up of power MOSFETs (metal oxide semiconductor field effect transistors) connected in an H-configuration, an operational amplifier circuit, a digital to analog converter (DAC) circuit, etc. Responsive to an input symbol sequence, the write driver 140 supplies bi-directional write currents to a write coil 142 of the write pole 118 (FIG. 2) to write magnetization patterns such as represented in FIG. 3. Except as modified below, the write currents nominally switch direction at each symbol boundary between a maximum rail current $I_{MAX}$ from current source 144 and a minimum rail current $I_{MIN}$ from current source 146. The rail currents can vary, but exemplary values may be ±25 milliamps, mA, etc. Any suitable current values can be used, including asymmetric values (e.g., +30 mA and −20 mA). Intermediate currents, such as zero currents, can be generated as a current between the maximum $I_{MAX}$ and minimum $I_{MIN}$ rail currents.

Rail voltage sources can be used by the write driver in lieu of the current sources represented in FIG. 5, but write currents will still be applied through the coil to effect the desired magnetization fields to magnetize the medium. Therefore, the present discussion will describe the write driver in terms of applied write currents. This applies to other forms of write poles as well since even if voltages are applied, currents will flow through the write pole.

Figure 6:
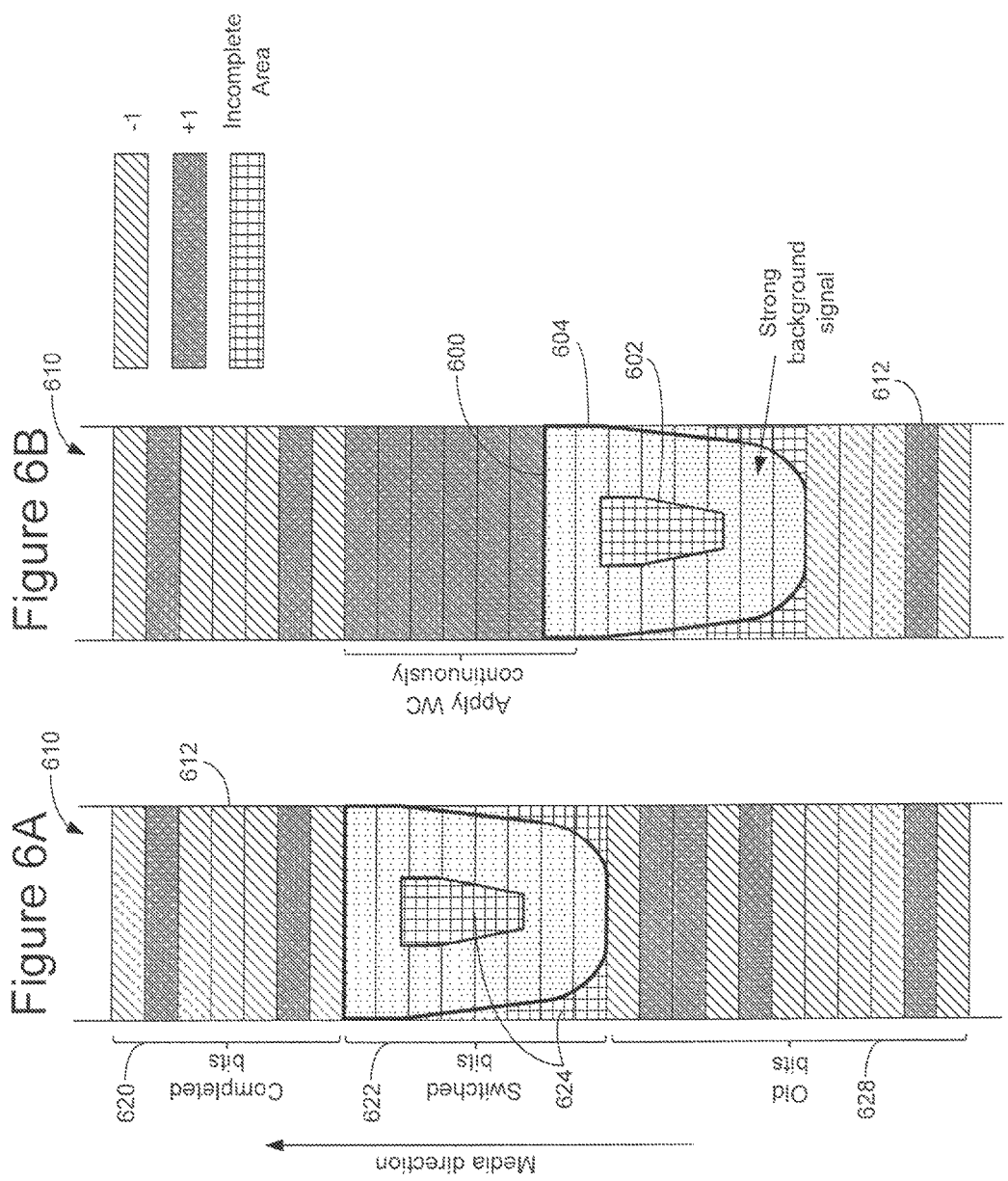
FIGS. 6A and 6B show a schematic top plan view of a write pole of the write coil of FIG. 5 positioned relative to a data track, the write pole having an effective write pole footprint in accordance with various embodiments.

FIGS. 6A and 6B show a schematic top plan view of a main pole footprint 600 of the write coil 142 (FIG. 5) positioned relative to a data track 610. The main pole footprint 600 is the magnetic field contour generated by a write operation. The actual configuration of the main pole footprint 600 will depend on the construction of the storage device, so the geometry shown in FIGS. 6A and 6B is merely exemplary and is not necessarily limiting. The main pole footprint 600 includes a central aperture 602, where the magnetic field is slightly weaker than at other regions of the main pole footprint 600. As such, the central aperture 602 may only magnetically flip a certain percentage (e.g., 90%) of the media grain under the central aperture 602, though it is not completely flipped (shown as incomplete area 624). Because the percentage of the media grain flipped under the central aperture 602 is high, this media grain can be considered fully flipped for practical purposes. It is noted that small incomplete areas 624 near the sides of the leading edge of the main pole footprint 600 do not significantly affect the written-on media and read back waveform.

Embodiments of the disclosure are directed to determining the effective size (e.g., downtrack length) of the main pole footprint 600. For example, the effective write pole footprint of the write coil characterized in FIGS. 6A and 6B may be determined to be 6T or 7T in length. Determining the effective write pole footprint is important, since writing data patterns to the media is based on both the length of the data pattern and the effective write pole footprint according to embodiments of the disclosure.

When writing data patterns to track 610 using a conventional approach, the write current is applied continuously over the length of the data pattern, as is shown in FIG. 6B. For example, to write a 7T data pattern using a conventional approach, the write current is applied seven times longer than when writing a 1T data pattern. This conventional writing approach has three primary drawbacks when applying the write current continuously for a long data pattern. The first involves high adjacent track erasure. The second involves high power consumption. The third involves a strong background signal.

For example, using a conventional writing approach, write current is continuously applied for the entire length of the data pattern. After writing the last bit (e.g., +1), the next m bits (e.g., 6 bits) in the downtrack direction also become +1 due to the effective write pole footprint (of length mT, such as 6T or 7T). The write pole would need to flip all the media grain magnetized as +1 when writing −1, for example, which is indicative of a strong background signal. According to a writing approach of the present disclosure, because no write current is applied after the first two bits (assuming and EWPF of 6T or 7T), for example, the background will be random with both +1 and −1, which makes it much easier for the write pole to flip the media grain to −1 (e.g., a weak background signal).

Individual bits 612 along the track 610 correspond to the channel clock rate T and are represented by rectangular boxes. The bits along the track 610 have different statuses during the write operation as shown. Completed bits (e.g., bits that have been successfully written by the EWPF 604 of the write pole 600) are denoted at 620. Actively switched bits (e.g., written bits that are being switched by the EWPF 604 of the write pole 600) are denoted at 622 and are shown as a dot-pattern for reference. It can seen in FIGS. 6A and 6B that, of the switched bits 622, those nearest the trailing edge of the write pole 600 are fully switched bits. Those bits under the central aperture 602 and those nearest the leading edge of the write pole 600 are partially switched bits, shown as an incomplete area 624. As will be recognized, a bit may include many magnetic grains in the recording layer. An incomplete bit is one in which not all of the grains have been completely switched from positive to negative or negative to positive since the bit is not fully covered by the EWPF 604 of the write pole 600. However, it is not necessary for all bits to be completed bits for long T data patterns, because no write current is applied after the first two bits (assuming an EWPF of 6T or 7T). Old bits are denoted at 628 and represent old data previously written during a previous write operation and which are about to be overwritten by the present write operation. Each of the bits 612 will nominally have a selected magnetization (e.g., into or out of the page) based on the direction of write current. Flux transitions will occur at certain bit boundaries in the manner described above (see e.g., FIG. 3).

From FIGS. 6A and 6B, it can be seen that the size of the EWPF 604 of the write pole 600 is such that multiple bits (e.g., the switched bits 622) are switched concurrently. As illustrated, switching the first bit at the trailing edge of the EWPF 604 causes concurrent switching of the next seven bits. Accordingly, and assuming a sufficiently large EWPF, the arrangement of FIGS. 6A and 6B may allow the intermediate value of current to be applied for up to seven clock periods (seven bits 612) prior to each transition on the basis that these bits will have already been magnetized to the correct magnetization orientation. For longer symbol lengths, such as a 12T symbol, the EWPF 604 is used as an interval for applying one or more additional write currents, which is discussed in greater detail hereinbelow. Such longer symbol lengths can also have one or more intermediate bits 612 with the intermediate current value (e.g., 0 mA) since these bits will also have been already magnetized to the correct orientation. Using the effective write pole footprint as an interval and intermediate current values during the writing of relatively longer symbols provides a number of beneficial effects, including reduced power and heat dissipation, reduced background signal, reduced coil saturation, minimized adjacent track erasure, etc.

Figure 7:
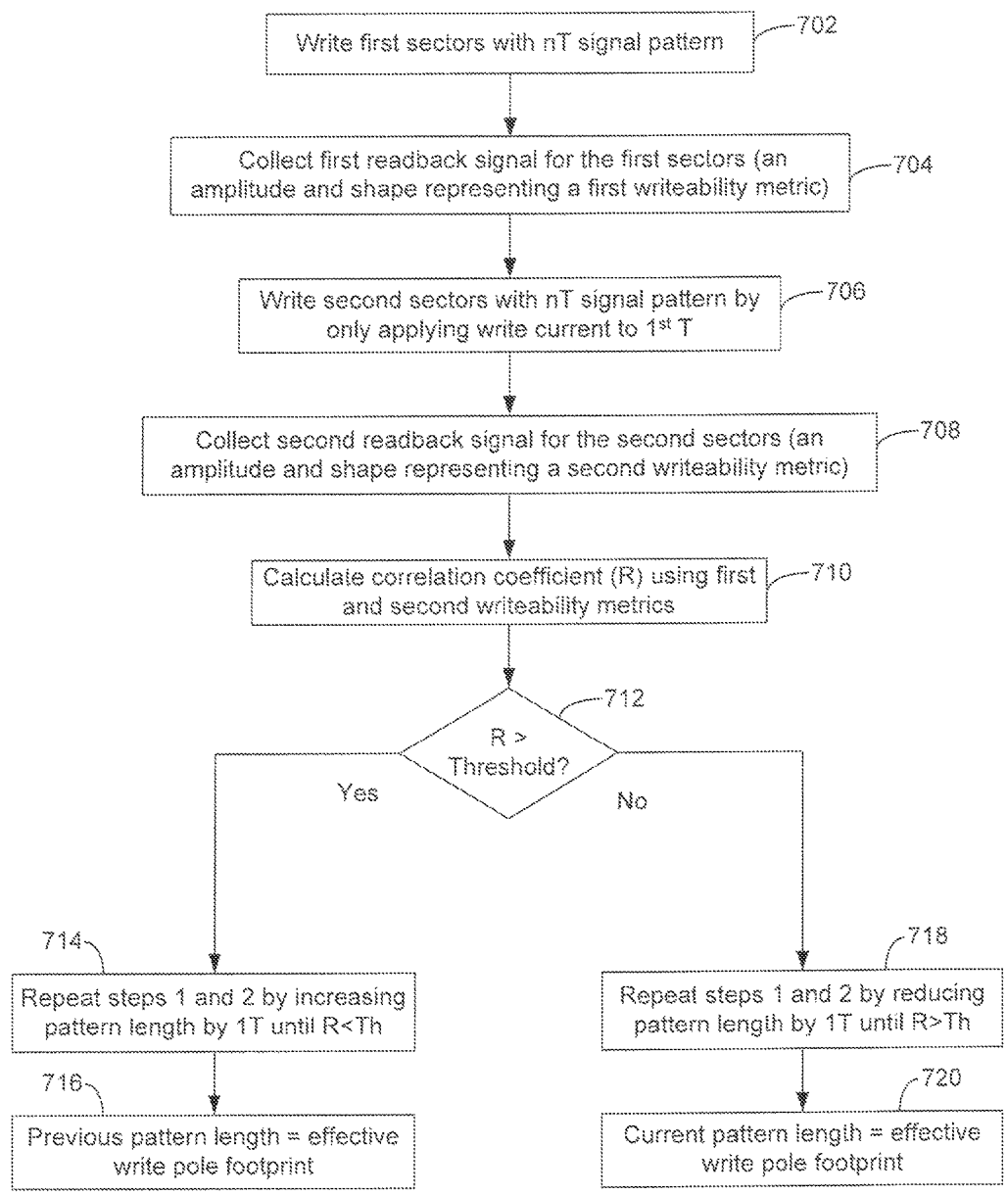
FIG. 7 illustrates a method for measuring the effective footprint of a write pole in accordance with various embodiments.

FIG. 7 illustrates a method for measuring the effective footprint of a write pole in accordance with various embodiments. The method shown in FIG. 7 involves writing 702 a signal pattern having a length of nT to a number of first sectors of a magnetic storage disc, where n is an integer and the write current is continuously applied. In some approaches, the length of the signal pattern can be lower than or greater than the expected length of the effective footprint of the write pole. For example, it may be known in the factory that a write pole of a particular head design has an effective footprint that generally varies between 5 and 7T. As such, the signal pattern of block 702 can have a length of 3 or 4T or, alternatively, a length of 8 or 9T. In other approaches, the length of the signal pattern used in block 702 can be the same as the expected effective write pole footprint (e.g., 6T) of a given head design.

The method involves collecting 704 a first readback signal from the first sectors, which is preferably converted from analog form to digital form. The amplitude and shape of the first readback signal represents a first writeability metric. The method shown in FIG. 7 also involves writing 706 a number of second sectors with the same nT signal pattern (same length as in blocks 702, 704) by only applying write current to the 1$^{st}$ T. No write current is applied after the 1$^{st}$ T. The method further involves collecting 708 a second readback signal from the second sectors, which is preferably converted from analog form to digital form. The amplitude and shape of the second readback signal represents a second writeability metric.

The method involves calculating 710 a correlation coefficient (R) using the first and second writeability metrics. It is noted that if both the amplitude and shape of the first and second readback signals are the same, then the signal pattern written to the first and second sectors is the same, resulting in a correlation coefficient (R) of 1. If the amplitude and/or shape of the first and second readback signals differ, then the signal pattern written to the first and second sectors is different, resulting in a correlation coefficient (R) of less than 1. The correlation coefficient (R) is compared to a threshold (e.g., 0.98). If the correlation coefficient (R) is greater than the threshold, the effective footprint of the write pole is longer than the nT signal pattern used to generate the signal pattern. If the correlation coefficient (R) is not greater than the threshold, the effective footprint of the write pole is shorter than the nT signal pattern used to generate the signal pattern.

Referring to block 712, if the correlation coefficient (R) is greater than the threshold, the processes of blocks 702-710 are repeated by increasing the pattern length by 1T until the correlation coefficient (R) is less than the threshold. When the correlation coefficient (R) is less than the threshold at block 714, it is determined at block 716 that the previous pattern length represents the effective write pole footprint. For example, the second to last iteration of block 714 may result in increasing the signal pattern length from 7T to 8T. It is assumed that at 7T, the correlation coefficient (R) is greater than the threshold. At 8T (last iteration), however, it may be determined that the correlation coefficient (R) is less than the threshold. As such, the effective write pole footprint determined at block 716 is the previous pattern length, 7T. The processes at block 714 seek to increase the signal pattern length until the signal pattern length produces a correlation coefficient (R) that is less than the threshold.

Referring again to block 712, if the correlation coefficient (R) is not greater than the threshold, the processes of blocks 702-710 are repeated by reducing the signal pattern length by 1T until the correlation coefficient (R) is greater than the threshold. When the correlation coefficient (R) is greater than the threshold, it is determined at block 720 that the current pattern length represents the effective write pole footprint. For example, the last iteration of block 718 may result in reducing the signal pattern length from 7T to 6T. It is assumed that at 7T, the correlation coefficient (R) is less than the threshold, and that at 6T the correlation coefficient (R) is greater than the threshold. As such, the effective write pole footprint determined at block 720 is the current pattern length, 6T. The processes at block 718 seek to reduce the signal pattern length until the signal pattern length produces a correlation coefficient (R) that is greater than the threshold. It is noted that the computations performed in FIG. 7 may be implemented by the preamp 132, the write control circuit 220, or other processor, controller or logic circuit of the R/W channel 130 (see FIG. 4).

Figure 8:
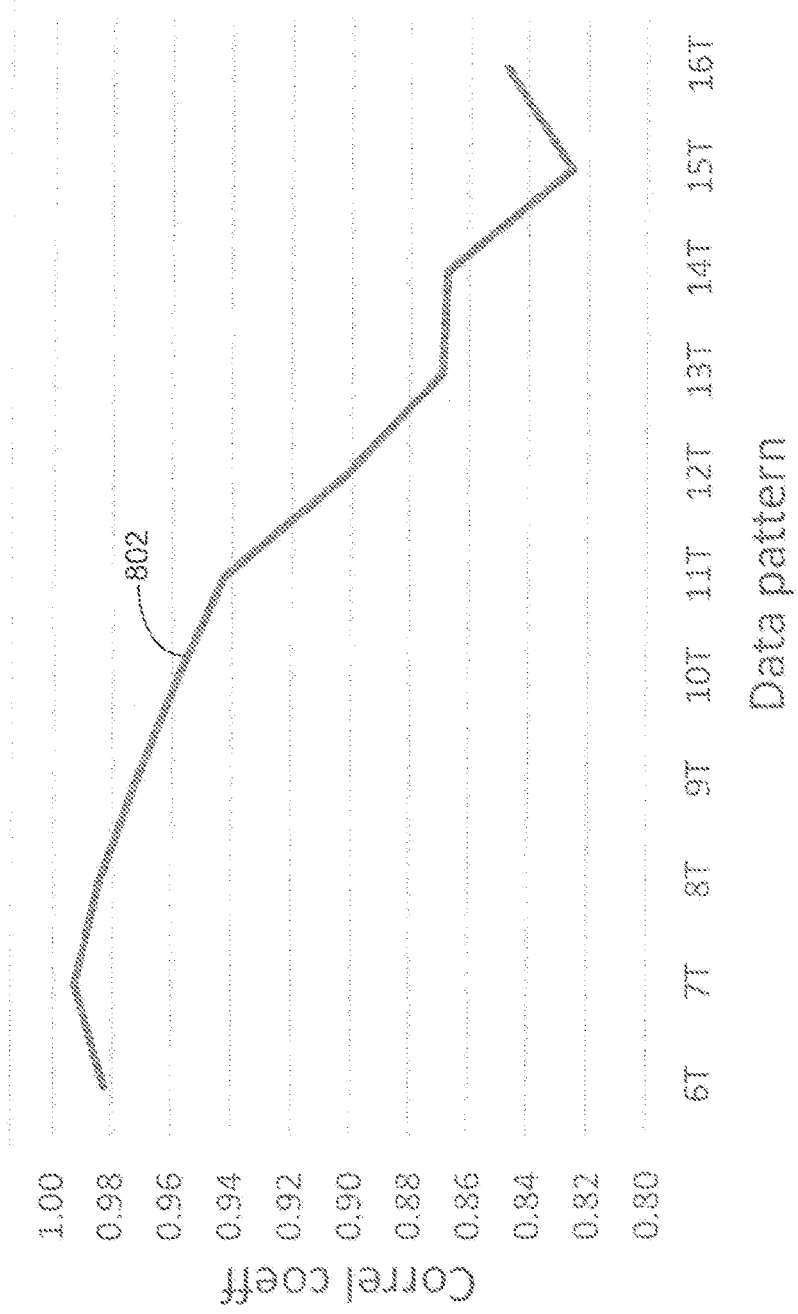
FIG. 8 is a plot of correlation coefficient (R) for signal patterns having varying length in connection with the methodology of FIG. 7 for measuring the effective footprint of a write pole in accordance with various embodiments.

FIG. 8 is a plot 802 of correlation coefficient (R) for signal patterns having a length ranging from 6T to 16T. The correlation coefficient (R) is calculated for first and second writeability metrics as described in block 702-710 of FIG. 7. It can be seen in FIG. 8 that the correlation coefficient (R) exceeds a threshold of 0.98 for signal patterns having a length of 6T, 7T, and 8T. At a length of 9T, however, the correlation coefficient (R) falls below the threshold of 0.98. By applying the EWPF measurement methodology shown in FIG. 7 to the data illustrated in FIG. 8, it can be seen that the effective write pole footprint for the head under test has a length of 8T.

As was previously discussed, the effective write pole footprint will vary across the stroke as a function of skew between the outer diameter (OD) and the inner diameter (ID) of the disc. According to various embodiments, the effective write pole footprint can be measured on a per-head basis and across the stroke between the OD and ID of the disc. For example, the effective write pole footprint can be measured for pre-selected zones from the OD to the ID of the disc which takes into consideration the effect of skew angle. Measuring the EWPF for pre-selected zones reduces test time. Also, there may be little difference in the EWPF among adjacent zones, such that many zones can share one EWPF. For example, one EWPF can be used for all data zones rather than pre-selected zones in some embodiments. Each of these measurements can be stored in a memory of the HDD and recalled when writing data to the disc.

According to some embodiments, 10 zones with equal track intervals can be selected between the OD and the ID of the disc. The effective write pole footprint can be measured for each of the selected zones based on the methodology shown in FIG. 7. Curve fitting can be used to obtain the effective write pole footprint for each of the zones, the result of which can be rounded down to the nearest bit number. For example, the effective write pole footprint at zone 102 may be calculated from curve fitting as 5.8. Rounding down to the nearest bit number from 5.8 results in an effective write pole footprint of 5. Accordingly, an effective write pole footprint of 5 is used for writing to zone 102. This procedure can be used for determining the effective write pole footprint for each head and each zone of the disc.

Figure 9:
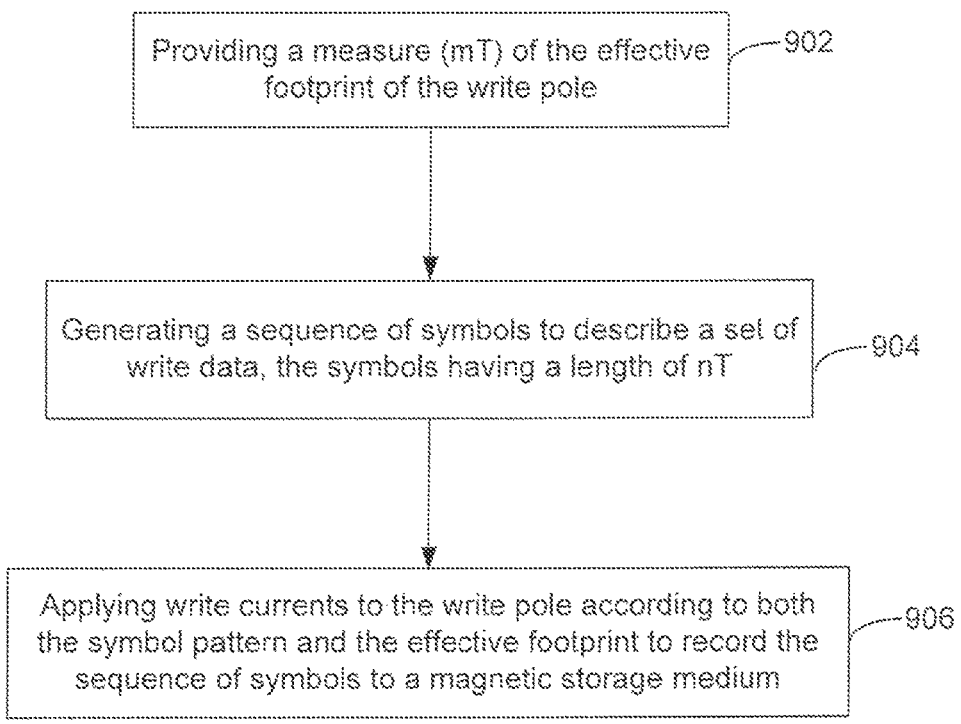
FIG. 9 illustrates a method for enhancing write current switching efficiencies during data write operations using the effective footprint of a write pole in accordance with various embodiments.

FIG. 9 illustrates a method for enhancing write current switching efficiencies during data write operations using the effective footprint of a write pole in accordance with various embodiments. The method shown in FIG. 9 involves providing 902 a measure (mT, where m is an integer) of the effective footprint of the write pole. The EWPF measurement may be obtained using the methodology shown in FIG. 7 for a particular head and zone on the disc. The method also involves generating 904 a sequence of symbols to describe a set of write data. Each of the symbols has a length of nT. The method further involves applying 906 write currents to the write pole according to both the symbol pattern and the effective footprint of the write pole to record the sequence of symbols to a magnetic storage medium. According to some embodiments, applying a write current comprises applying a write current and an overshoot for the $1^{st}$ T of each symbol.

Figure 10:
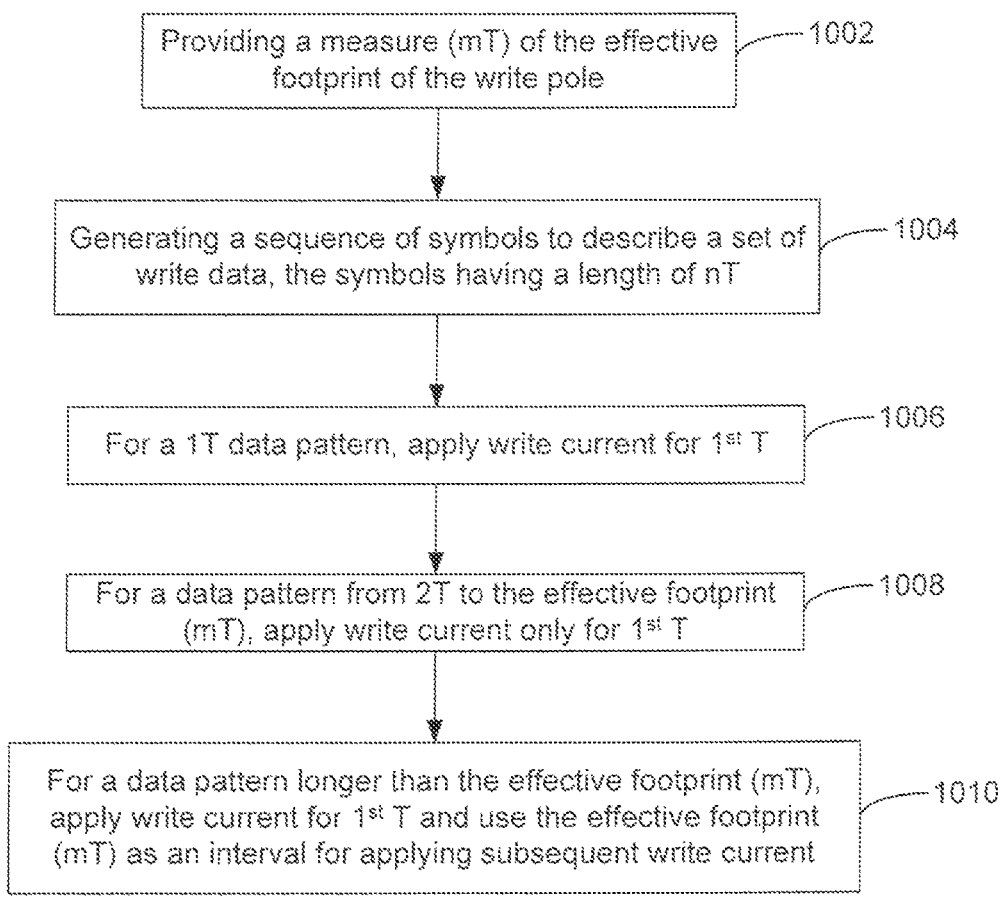
FIG. 10 illustrates a method for enhancing write current switching efficiencies during data write operations using the effective footprint of a write pole in accordance with various embodiments.
Figure 12:
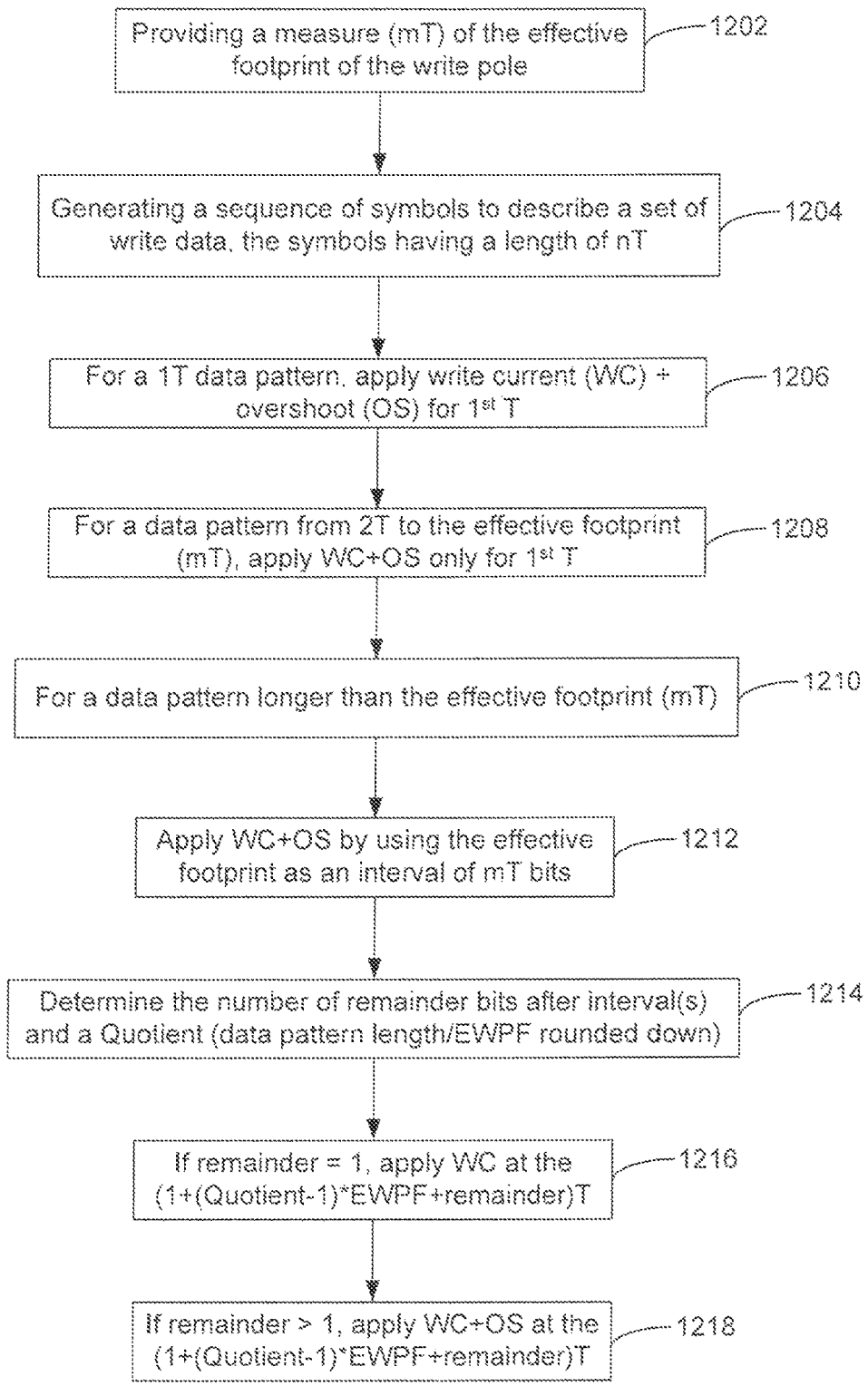
FIG. 12 illustrates a method for enhancing write current switching efficiencies during data write operations using the effective footprint of a write pole in accordance with various embodiments.

FIG. 10 illustrates a method for enhancing write current switching efficiencies during data write operations using the effective footprint of a write pole in accordance with various embodiments. The method shown in FIG. 10 involves providing 1002 a measure (mT) of the effective footprint of the write pole, such as by use of the methodology shown in FIG. 7 for a particular head and zone on the disc. The method also involves generating 1004 a sequence of symbols to describe a set of write data. Each of the symbols has a length of nT. According to the embodiment shown in FIG. 10, the application of write currents to the write pole is dependent on the length of the data pattern relative to the length of the effective write pole footprint. For a 1T data pattern, write current is applied 1006 for the $1^{st}$ T. For a data pattern having a length from 2T to the effective write pole footprint (mT), write current is applied 1008 only for the $1^{st}$ T. For example, no current (or the intermediate current) is applied after the $1^{st}$ T. For a data pattern that is longer than the effective write pole footprint (mT), write current is applied 1010 for the $1^{st}$ T and the effective write pole footprint (mT) is used as an interval for applying a subsequent write current(s). FIG. 12, for example, illustrates a representative approach for using the effective write pole footprint as an interval for applying a subsequent write current when writing data patterns longer than the EWPF. According to some embodiments, applying a write current comprises applying a write current and an overshoot for the $1^{st}$ T of each symbol.

Figure 11:
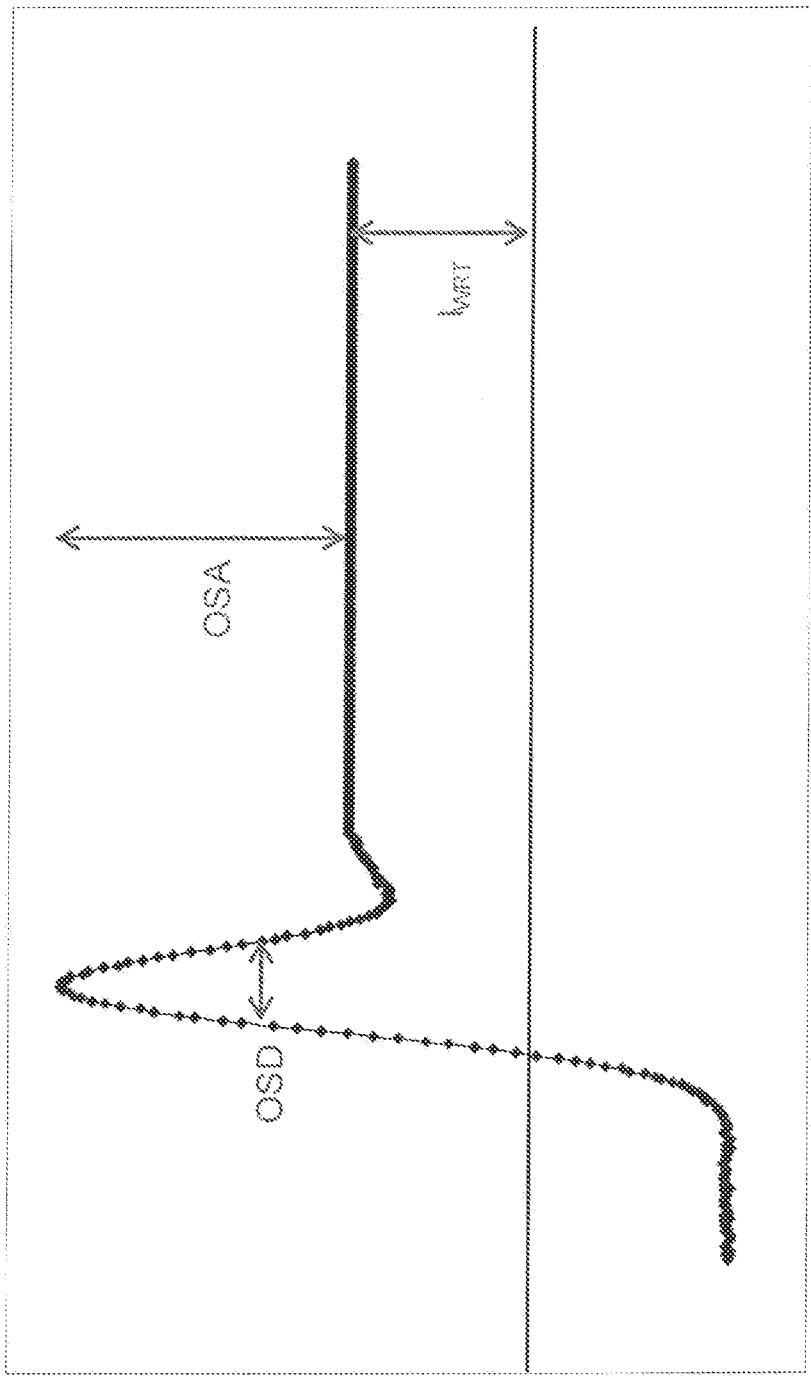
FIG. 11 illustrates a representative write triplet in accordance with various embodiments.

According to various embodiments, writing data patterns of various lengths involves writing so-called "write triplets" to the disc. FIG. 11 illustrates a representative write triplet. The write triplet shown in FIG. 11 includes three components: an overshoot duration (OSD), an overshoot amplitude (OSA), and a write current ($I_{WRT}$). In general, a write triplet is written at each transition (symbol boundary). A write triplet is also written at each positive or negative excursion from the intermediate (e.g., zero) current value for symbols longer than the EWPF. In some cases, a write triplet is written at the positive and negative excursions from the intermediate (e.g., zero) current value for symbols longer than the EWPF. Representative examples of writing data patterns including write triplets are provided in FIGS. 13-15.

FIG. 12 illustrates a method for enhancing write current switching efficiencies during data write operations using the effective footprint of a write pole in accordance with various embodiments. The method shown in FIG. 12 involves providing 1202 a measure (mT) of the effective footprint of the write pole, such as by use of the methodology shown in FIG. 7 for a particular head and zone on the disc. The method also involves generating 1204 a sequence of symbols to describe a set of write data. Each of the symbols has a length of nT. According to the embodiment shown in FIG. 12, the application of write currents to the write pole is dependent on the length of the data pattern relative to the length of the effective write pole footprint. For a 1T data pattern, write current (WC) plus overshoot (OS) (hereinafter referred to as WC+OS) is applied 1206 for the $1^{st}$ T. For a data pattern having a length from 2T to the effective write pole footprint (mT, such as 5T), WC+OS is applied 1208 only for the $1^{st}$ T. For example, no current (or the intermediate current) is applied after the $1^{st}$ T. For a data pattern (e.g., 8T) that is longer than the effective write pole footprint (mT, such as 5T) 1210, WC+OS is applied for the $1^{st}$ T, and the effective write pole footprint (mT) is used as an interval for applying 1212 one or more subsequent write currents in the following manner.

A count is made to determine 1214 the number of remainder bits after applying the interval of mT (or multiples of the interval mT). A Quotient is also calculated 1214 by dividing the data pattern length by the EWPF, and rounding down. If the remainder=1, write current (WC) is applied 1216 at the (1+(Quotient−1)*EWPF+remainder)T, where Quotient= (symbol length)/EWPF rounded down. If the remainder >1, WC+OS is applied 1218 at the (1+(Quotient−1)*EWPF+ remainder)T. It is noted that the remainder and the Quotient may be determined by the preamp 132, the write control circuit 220, or other processor, controller or logic circuit of the R/W channel 130 (see FIG. 4).

For example, assume that mT for the EWPF is 5T and the symbol length is 6T. In this example, the remainder is 1 (6T−5T) and the Quotient is 1 (6/5=1.2 rounded down to 1). Since the remainder of 1=1, write current (WC) is applied 1216 at the (1+(1−1)5+1)T=2T. As such, write current (WC) is applied at the $2^{nd}$ T. In this scenario, WC+OS is applied at the $1^{st}$ T and WC is applied at the $2^{nd}$ T. Notably, applying WC at the $2^{nd}$ T results in switching the last five bits of the 6T symbol, which is equivalent to the EWPF of 5T.

Figure 13:
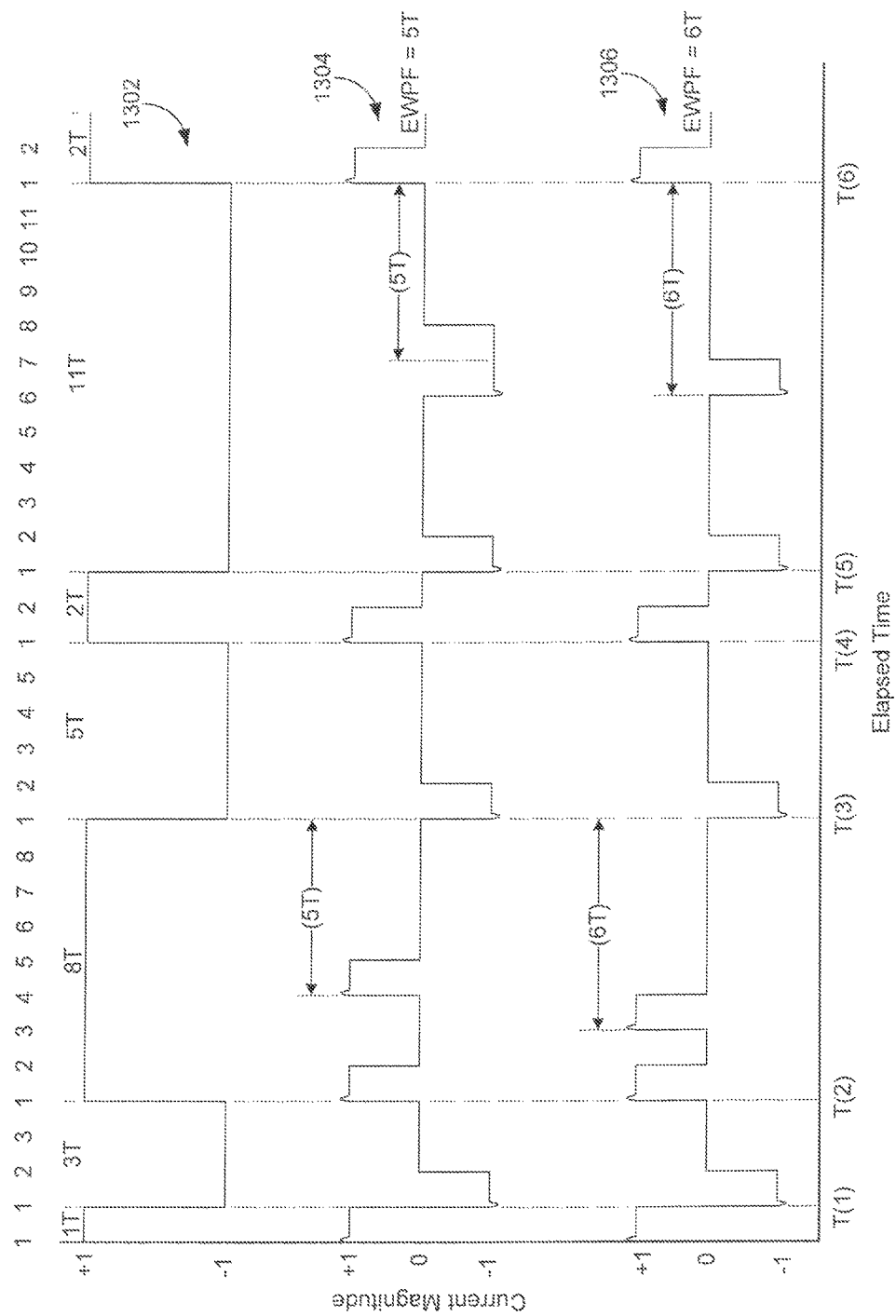
FIG. 13 is a graphical representation of three different write current command signals for writing data patterns with different symbol length using the method of FIG. 12, wherein the latter two signals are generated using different effective footprints of a write pole in accordance with various embodiments.

By way of further example, assume that mT for the EWPF is 5T and the symbol length is 8T. In this example, the remainder is 3 (8T−5T) and the Quotient is 1 (8/5=1.6 rounded down to 1). Since the remainder of 3 is greater than 1, WC+OS is applied 1218 at the (1+(1−1)5+1)T=4T. As such, WC+OS is applied at the $4^{th}$ T. This scenario is illustrated in FIG. 13 for the 8T symbol, where the EWPF=5T. As is shown in FIG. 13, WC+OS is applied at the $1^{st}$ T and the $4^{th}$ T. Notably, applying WC+OS at the $4^{th}$ T results in switching the last five bits of the 8T symbol, which is equivalent to the EWPF of 5T.

FIG. 13 is a graphical representation of three different signals 1302, 1304, and 1306, wherein the latter two signals 1304 and 1306 are write current command signals generated in accordance with various embodiments. The signal 1302 represents a data pattern comprising symbols with different lengths to be written to a disc. The signal 1304 represents a write current command signal generated by a writer having an effective write pole footprint of 5T in accordance with various embodiments. The signal 1306 represents a write current command signal generated by a writer having an effective write pole footprint of 6T in accordance with various embodiments. Data can be written to a disc according to the methodologies illustrated in FIGS. 9, 10, and 12 using the write current command signals 1304 and 1306.

The signals 1302, 1304, 1306 are plotted against an elapsed time x-axis and a combined current magnitude y-axis. The signals 1304 and 1306 can take the form of extended frequency modulated (EFM) signals with alternating levels from −1 to +1 and signal transitions T(1) through T(6) at symbol boundaries. Seven (7) symbols having lengths of 1T, 3T, 8T, 5T, 2T, 11T, and 2T are shown for purposes of illustration, although other symbol lengths can be used as desired.

Using a conventional writing approach for writing the signal 1302, a full rail-to-rail current switching operation would be required to transition between each adjacent pairs of symbols. For example, positive-to-negative current switching transitions in signal 1302 are denoted at the transitions T(1), T(3), and T(5) as the system commences writing the 3T, 5T, and 11T symbols, respectively. Negative-to-positive current switching transitions are denoted at the transitions T(1), T(2), T(4), and T(6) to signify the writing of the 1T, 8T, and 2T symbols and the symbol (2T) that immediately follows the 11T symbol.

While operable, it has been found that switching the write current between the $I_{MIN}$ and $I_{MAX}$ current rails can require a relatively significant amount of rise time and settle time as the current direction is switched over the full range between the respective rails (e.g., from −25 mA to +25 mA and vice versa). This can provide an upper limit to the smallest achievable symbol size based on the non-instantaneous response characteristics of the circuit.

Accordingly, various embodiments configure the storage device 100 to provide intermediate current values, or levels, immediately after the $1^{st}$ T of each symbol longer than 1T. For symbols longer than the effective write pole footprint, intermediate current levels are provided for at least the last m−1 bits, where mT is the effective write pole footprint. The intermediate (reduced or zero) current values are between the respective rail current values levels $I_{MAX}$ and $I_{MIN}$. In FIG. 13 (and FIGS. 14-15), the intermediate current level is 0 mA. The intermediate current level can be any suitable value between the respective rail currents. In some embodiments, the $I_{MAX}$ and $I_{MIN}$ values are nominally about ±25 mA and the intermediate value is nominally about 0 mA. The EFM signals 1304, 1306 can thus be considered as a tri-state signal with three logical values −1 ($I_{MIN}$), 0 (intermediate value), and +1 ($I_{MAX}$).

The intermediate current values at the end of each symbol reduce the overall current swing necessary for the next symbol boundary. As can be observed from FIG. 13, the transition at T(2) for writing signal 1302 would require nominally a full 50 mA current swing, while the same transition for signals 1304, 1306 only requires about half that, or about 25 mA. Using one or more intermediate values as represented in FIG. 13 can provide significantly faster current switching and higher data recording densities. For example, empirical testing has determined that the rise time can be consistently reduced by about 35% or more using an intermediate current value as depicted in FIG. 13 (and FIGS. 14-15).

FIG. 13 shows the application of the write current switching methodology of FIG. 12 using write current command signal 1304 and a write pole having an effective footprint of 5T. For the 1T data pattern, WC+OS is applied for 1T to reach the +1 current level, returning to the 0 current level after the $1^{st}$ T. The next symbol to be written has a length of 3T. Because the 3T symbol has a length between 2T and the EWPF of 5T, WC+OS is applied only for the $1^{st}$ T to reach the −1 current level, returning to the 0 current level after the $1^{st}$ T. The write current remains at the 0 current level for the next 2T of the 3T symbol. The next symbol to be written has a length of 8T. Because the 8T symbol has a length greater than the EWPF of 5T, WC+OS is applied for the $1^{st}$ T to reach the +1 current value, returning to the 0 current level after the $1^{st}$ T. A remainder is calculated as 8T−5T=3T, and a Quotient is calculated as (8/5 rounded down)=1. Since the remainder of 3 is greater than 1, WC+OS is applied at the $4^{th}$ T (the (1+(1−1)*5+3)T)) of the 8T symbol. It can be seen in FIG. 13 that applying WC+OS at the $4^{th}$ T results in switching the last five bits of the 8T symbol, which is equivalent to the EWPF of 5T.

The next symbol to be written has a length of 5T. Because the symbol 5T has a length equal to that of the EWPF, WC+OS is applied only for the $1^{st}$ T to reach the −1 current level, returning to the 0 current level after the $1^{st}$ T. The write current remains at the 0 current level for the next 4T of the 5T symbol. The next symbol to be written has a length of 2T. Because the symbol 2T has a length from 2T to the EWPF, WC+OS is applied only for the $1^{st}$ T to reach the +1 current level, returning to the 0 current level after the $1^{st}$ T. The next symbol to be written has a length of 11T, which is longer than the EWPF of 5T. Because the 11T symbol has a length greater than the EWPF, WC+OS is applied for the $1^{st}$ T to reach the −1 current value, returning to the 0 current level after the $1^{st}$ T. A such, the first five bits (equal to the size of the EWPF) of the 11T symbol are concurrently switched by application of WC+OS at the $1^{st}$ T. The 11T symbol has a length that includes two intervals of the EWPF (e.g., 11T−5T−5T=1T), leaving a remainder of 1T. As such, WC+OS is applied at the $6^{th}$ T (1T+5T). With a remainder=1 and a Quotient=2 (11/5 rounded down), WC is applied at (1+(2−1)5+1)T=7T. As a result, WC+OS is applied at the $6^{th}$ T to reach the −1 current level. WC is applied at the $7^{Th}$ T at the −1 current level, which switches the remaining bits of the 11T symbol, such that the last 5 bits are switched (equal to the size of the EWPF).

FIG. 13 also shows the application of the write current switching methodology of FIG. 12 using write current command signal 1306 and a write pole having an effective write pole footprint of 6T. For the 1T data pattern, WC+OS is applied for 1T to reach the +1 current level, returning to the 0 current level after the $1^{st}$ T. The next symbol to be written has a length of 3T. Because the 3T symbol has a length between 2T and the EWPF of 6T, WC+OS is applied only for the $1^{st}$ T to reach the −1 current level, returning to the 0 current level after the $1^{st}$ T. The write current remains at the 0 current level for the next 2T of the 3T symbol. The next symbol to be written has a length of 8T. Because the 8T symbol has a length greater than the EWPF of 6T, WC+OS is applied for the $1^{st}$ T to reach the +1 current, returning to the 0 current level after the $1^{st}$ T. A remainder is calculated as 8T−6T=2T, and a Quotient is calculated as (8/6 rounded down)=1. Since the remainder of 2 is greater than 1, WC+OS is applied at the $3^{rd}$ T (the (1+(1−1)*5+2) of the 8T symbol. It can be seen in FIG. 13 that applying WC+OS at the $3^{rd}$ T results in switching the last six bits of the 8T symbol, which is equivalent to the EWPF of 6T.

The next symbol to be written has a length of 5T. Because the symbol 5T has a length less than that of the EWPF, WC+OS is applied only for the $1^{st}$ T to reach the −1 current level, returning to the 0 current level after the $1^{st}$ T. The next symbol to be written has a length of 2T. Because the symbol 2T has a length from 2T to the EWPF, WC+OS is applied only for the $1^{st}$ T to reach the +1 current level, returning to the 0 current level after the $1^{st}$ T. The next symbol to be written has a length of 11T, which is longer than the EWPF of 6T. Because the 11T symbol has a length greater than the EWPF, WC+OS is applied for the $1^{st}$ T to reach the −1 current value, returning to the 0 current level after the $1^{st}$ T. A such, the first six bits (equal to the size of the EWPF) of the 11T symbol are concurrently switched by application of WC+OS at the $1^{st}$ T. A remainder is calculated as 11T−6T=5T, and a Quotient is calculated as (11/6 rounded down)=1. Since the remainder of 5 is greater than 1, WC+OS is applied at the $6^{th}$ T (1+(1−1)*5+5) of the 11T symbol. It can be seen in FIG. 13 that applying WC+OS at the $6^{th}$ T results in switching the last six bits of the 11T symbol, which is equivalent to the EWPF of 6T.

Figure 14:
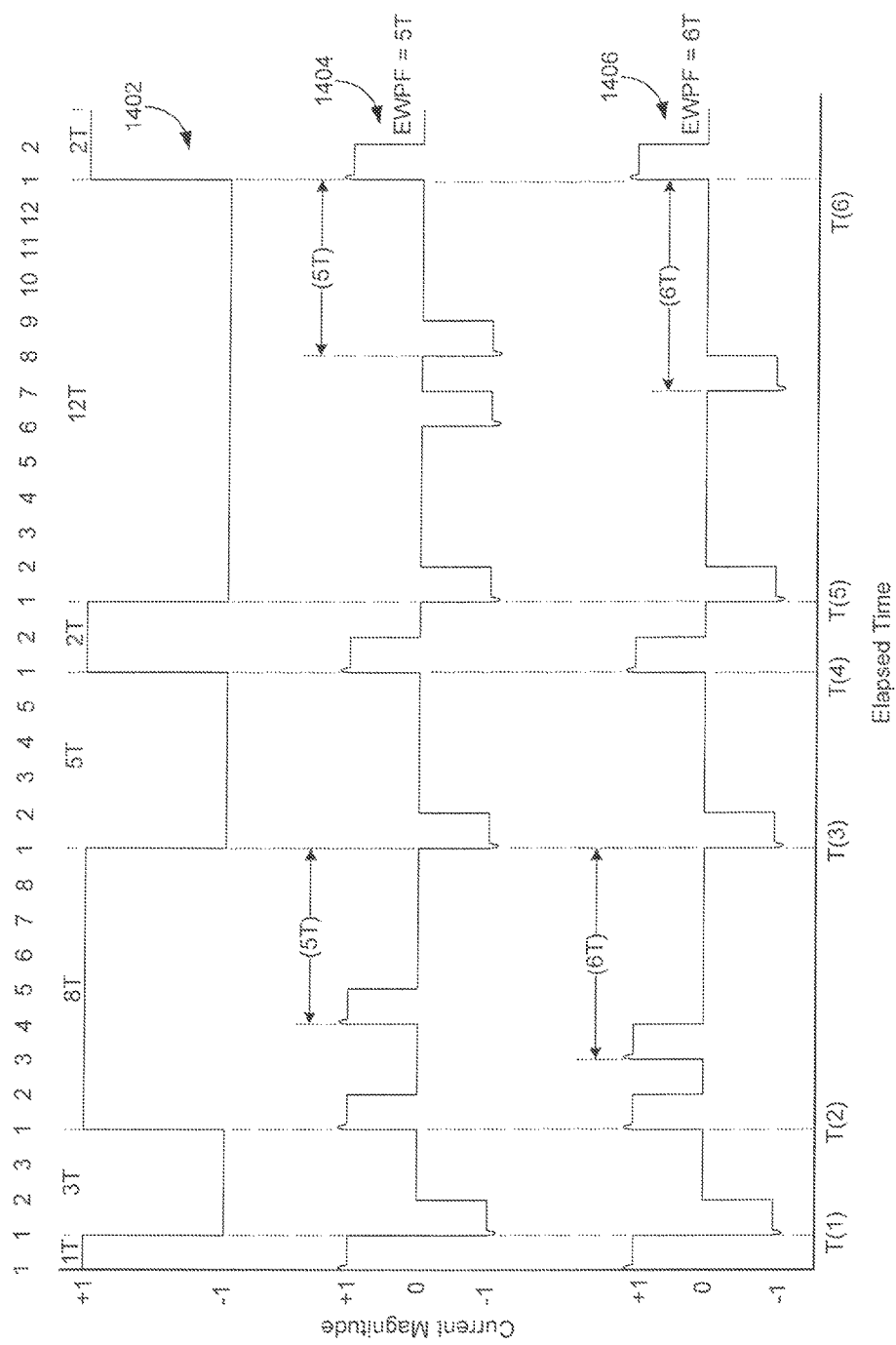
FIG. 14 is a graphical representation of three different write current command signals for writing data patterns with different symbol length using the method of FIG. 12, wherein the latter two signals are generated using different effective footprints of a write pole in accordance with various embodiments.

FIG. 14 shows the application of the write current switching methodology of FIG. 12 using write current command signal 1404 and a write pole having an effective write pole footprint of 5T. The signal 1402 represents a data pattern comprising symbols with different lengths to be written to a disc. In FIG. 14, the first five symbols (1T, 3T, 8T, 5T, 2T) are the same as those shown in FIG. 13. In FIG. 14, the sixth symbol has a length of 12T. Applying the methodology of FIG. 12 for write current command signal 1404, the write current is switched in the same way as that shown in FIG. 13 for the first five symbols (1T, 3T, 8T, 5T, 2T) when using write current command signal 1304.

The next symbol to be written has a length of 12T, which is longer than the EWPF of 5T. Because the 12T symbol has a length greater than the EWPF, WC+OS is applied for the $1^{st}$ T to reach the −1 current value, returning to the 0 current level after the $1^{st}$ T. A such, the first five bits (equal to the size of the EWPF) of the 12T symbol are concurrently switched by application of WC+OS at the $1^{st}$ T. The 12T symbol has a length that includes two intervals of the EWPF (e.g., 12T−5T−5T=2T), leaving a remainder of 2T. As such, WC+OS is applied at the $6^{th}$ T (1T+5T). With a remainder=2 and a Quotient=2 (12/5 rounded down), WC+OS is applied at the $8^{th}$ T ((1+(2−1)5+2)T) to reach the −1 current level, returning to the 0 current level after the $8^{th}$ T. Applying WC+OS at the $8^{Th}$ T at the −1 current level switches the remaining bits of the 12T symbol, such that the last 5 bits are switched (equal to the size of the EWPF).

FIG. 14 also shows the application of the write current switching methodology of FIG. 12 using write current command signal 1406 and a write pole having an effective write pole footprint of 6T. Applying the methodology of FIG. 12 for write current command signal 1406, the write current is switched in the same way as that shown in FIG. 13 for the first five symbols (1T, 3T, 8T, 5T, 2T) when using write current command signal 1306.

The next symbol to be written has a length of 12T, which is longer than the EWPF of 6T. Because the 12T symbol has a length greater than the EWPF, WC+OS is applied for the $1^{st}$ T to reach the −1 current value, returning to the 0 current level after the $1^{st}$ T. A such, the first six bits (equal to the size of the EWPF) of the 12T symbol are concurrently switched by application of WC+OS at the $1^{st}$ T. The 12T symbol has a length that includes two intervals of the EWPF (e.g., 12T−6T−6T=0T), leaving a remainder of 0T. Because the remainder=0, the last of the multiple intervals of the EWPF is not used to generate a write current. WC+OS is applied at the $7^{th}$ T (1T+6T) to reach the −1 current level, returning to the 0 current level after the $7^{th}$ T. Applying WC+OS at the $7^{th}$ T at the −1 current level switches the remaining bits of the 12T symbol, such that the last 6 bits are switched (equal to the size of the EWPF).

Figure 15:
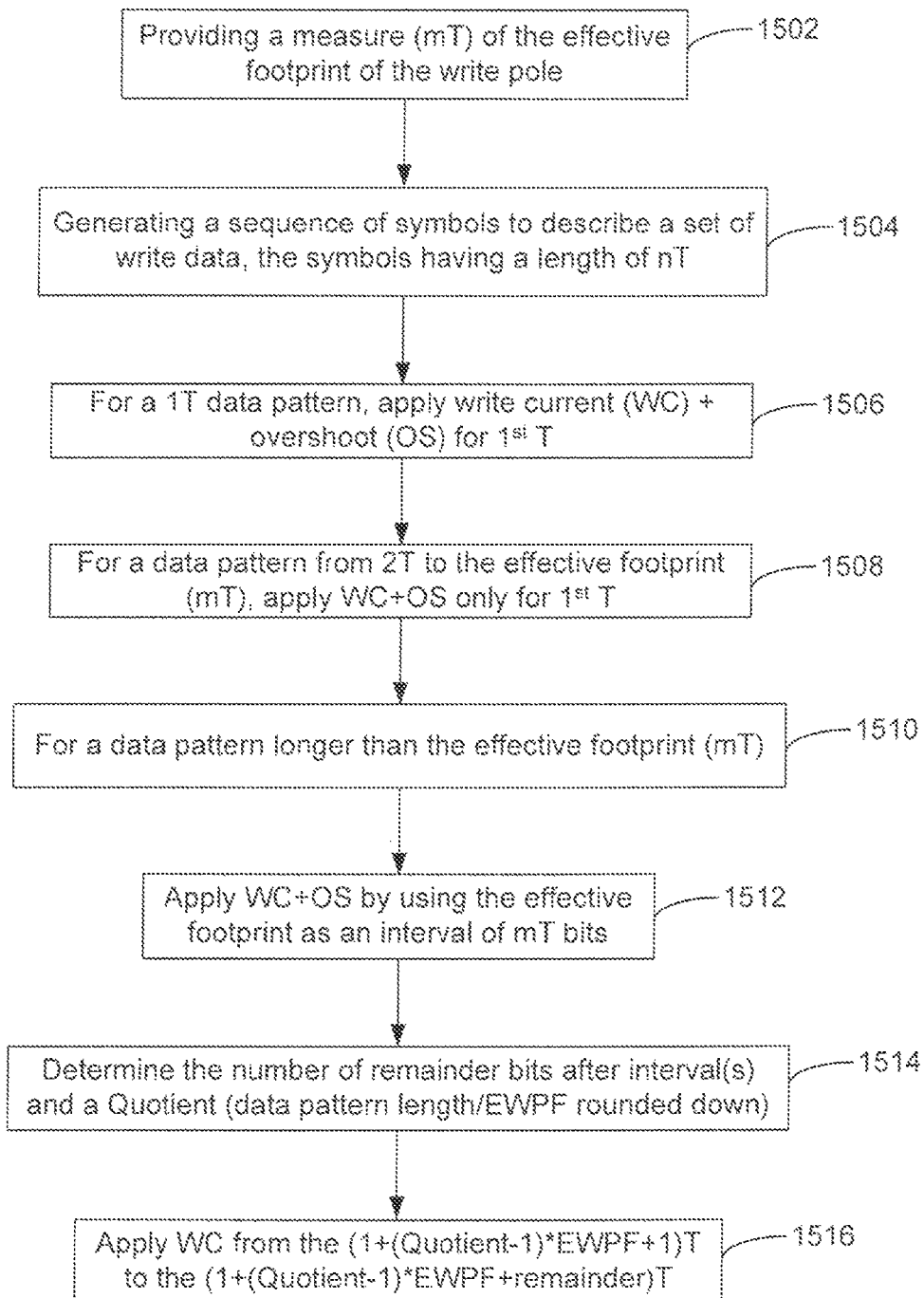
FIG. 15 illustrates an alternative method for enhancing write current switching efficiencies during data write operations using the effective footprint of a write pole in accordance with various embodiments.

FIG. 15 illustrates an alternative method for enhancing write current switching efficiencies during data write operations using the effective footprint of a write pole in accordance with various embodiments. The method shown in FIG. 15 involves providing 1502 a measure (mT) of the effective footprint of the write pole, such as by use of the methodology shown in FIG. 7 for a particular head and zone on the disc. The method also involves generating 1504 a sequence of symbols to describe a set of write data. Each of the symbols has a length of nT. According to the embodiment shown in FIG. 15, the application of write currents to the write pole is dependent on the length of the data pattern relative to the length of the effective write pole footprint. For a 1T data pattern, WC+OS is applied 1506 for the $1^{st}$ T. For a data pattern having a length from 2T to the effective write pole footprint, WC+OS is applied 1508 only for the $1^{st}$ T. For example, no current (or the intermediate current) is applied after the $1^{st}$ T. For a data pattern that is longer than the effective write pole footprint 1510, WC+OS is applied for the $1^{st}$ T, and the effective write pole footprint is used as an interval for applying 1512 one or more subsequent write currents in the following manner.

A count is made to determine 1514 the number of remainder bits after applying the interval of mT (or multiples of the interval mT). A Quotient is also calculated 1514 by dividing the data pattern length by the EWPF, and rounding down. A write current (WC) is applied 1516 from the (1+(Quotient−1)*EWPF+1)T to the (1+(Quotient−1)*EWPF+remainder) T. For example, assume that mT for the EWPF is 5T and the symbol length is 12T. In this example, the remainder is 2 (12T−5T−5T) and the Quotient is 2 (12/5=2.4 rounded down). The write current (WC) is applied 1516 from the $7^{th}$ T ((1+(2−1)*5+1)T) to the $8^{th}$ T ((1+(2−1)*5+2)T). As such, WC+OS is applied at the $1^{st}$ T and the $6^{th}$ T (1T+5T), and WC is applied from the $7^{th}$ T to the $8^{th}$ T.

Figure 16:
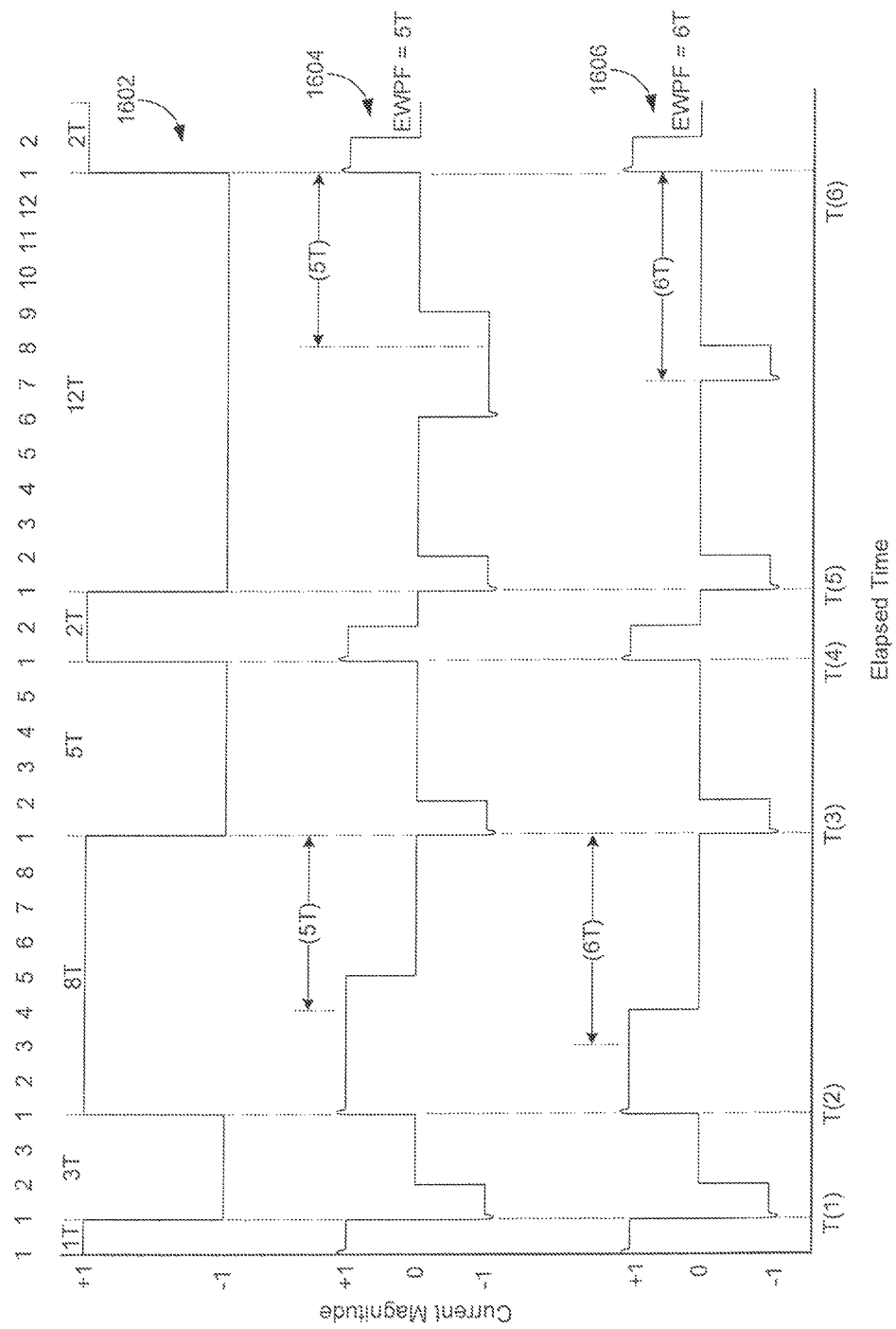
FIG. 16 is a graphical representation of three different write current command signals for writing data patterns with different symbol length using the alternative method of FIG. 15, wherein the latter two signals are generated using different effective footprints of a write pole in accordance with various embodiments.

FIG. 16 shows the application of the alternative write current switching method of FIG. 15 using write current command signal 1604 and a write pole having an effective write pole footprint of 5T. FIG. 16 also shows the application of the alternative write current switching method of FIG. 15 using write current command signal 1606 and a write pole having an effective write pole footprint of 6T. The signal 1602 represents a data pattern comprising symbols with different lengths to be written to a disc. For data patterns less than or equal to the EWPF, the alternative write current switching method of FIG. 15 implements the same rules as the method illustrated in FIG. 12. The two methods differ when the data pattern is longer than the EWPF. As such, the following discussion is directed to writing the 8T and 12T data patterns shown in FIG. 16.

For the 8T data pattern shown in FIG. 16 and an EWPF of 5T, WC+OS is applied for the $1^{st}$ T to reach the +1 current level, and the EWPF is used as an interval for applying subsequent write currents. The remainder=3 (8T−5T) and the Quotient=1 (8/5=1.6 rounded down). The write current (WC) is applied from the $2^{nd}$ T ((1+(1−1)*5+1)T) to the $4^{th}$ T ((1+(1−1)*5+3)T), returning to the 0 current level after the $4^{th}$ T. Applying WC at the $4^{Th}$ T at the +1 current level switches the remaining bits of the 8T symbol, such that the last 5 bits are switched (equal to the size of the EWPF).

For the 12T data pattern shown in FIG. 16 and an EWPF of 5T, WC+OS is applied for the $1^{st}$ T to reach the −1 current level, returning to the 0 current level after the $1^{st}$ T. As such, the first five bits (equal to the size of the EWPF) of the 12T symbol are concurrently switched by application of WC+OS at the $1^{st}$ T. The EWPF is used as an interval for applying subsequent write currents. The 12T symbol has a length that includes two intervals of the EWPF (e.g., 12T−5T−5T=2T), leaving a remainder of 2T. As such, WC+OS is applied at the $6^{th}$ T (1T+5T) to reach the −1 current level. With a remainder=2 and a Quotient=2 (12/5=2.4 rounded down), the −1 write current (WC) is applied from the $7^{th}$ T ((1+(2−1)*5+1)T) to the $8^{th}$ T (1+(2−1)*5+2), returning to the 0 current level after the $8^{th}$ T. Applying WC at the $8^{Th}$ T at the −1 current level switches the remaining bits of the 12T symbol, such that the last 5 bits are switched (equal to the size of the EWPF).

For the 8T data pattern shown in FIG. 16 and an EWPF of 6T, WC+OS is applied at the $1^{st}$ T to reach the +1 current level, and the EWPF is used as an interval for applying subsequent write currents. The remainder=2 (8T−6T) and the Quotient=1 (8/6=1.33 rounded down). The write current (WC) is applied from the $2^{nd}$ T ((1+(1−1)*5+1)T) to the $3^{rd}$ T ((1+(1−1)*5+2)T), returning to the 0 current level after the $3^{rd}$ T. Applying WC at the $3^{rd}$ T at the +1 current level switches the remaining bits of the 8T symbol, such that the last 6 bits are switched (equal to the size of the EWPF).

For the 12T data pattern shown in FIG. 16 and an EWPF of 6T, WC+OS is applied for the $1^{st}$ T to reach the −1 current level, returning to the 0 current level after the $1^{st}$ T. As such, the first six bits (equal to the size of the EWPF) of the 12T symbol are concurrently switched by application of WC+OS at the $1^{st}$ T. The EWPF is used as an interval for applying subsequent write currents. The 12T symbol has a length that includes two intervals of the EWPF (e.g., 12T−6T−6T=0T), leaving a remainder of 0T. As such, WC+OS is applied at the $7^{th}$ T (1T+6T) to reach the −1 current level, which switches the remaining bits of the 12T symbol, such that the last 6 bits are switched (equal to the size of the EWPF).

With reference again to FIG. 4, the R/W channel 140 includes a write control circuit 220 configured to provide write command signals to the write driver 140 (FIG. 5) so that the write driver outputs respective rail current and intermediate values through the write coil. In some embodiments, a tri-state EFM signal (see signals 1304, 1306, 1404, 1406, 1504, 1506 in FIGS. 13-15) is generated so that the intermediate values are received by the write driver as commands for zero (or some other suitable intermediate value) of current. Other control mechanisms can be utilized, such as enable/disable signals which are provided in addition to a "conventional" EFM signal with conventional full-rail transitions. The enable/disable signals can operate to temporarily disengage further outputting of current by the write driver.

The write control circuit 220 can be realized in hardware or software, or can involve functionality supplied by the controller 102 (FIG. 1) as required. In some cases, the circuit 220 analyzes the generated symbol sequence in the input encoded data stream and interjects intermediate values as required to form a modified symbol sequence which is then output to the write driver. In other embodiments, conventional input data sequences can be supplied to the preamp 144 (FIG. 5) and the preamp can be provided with internal circuitry that performs these functions. The length of the applied intermediate value (e.g., one bit, multiple bits) can be the same for all symbol lengths>1T, or the length can vary for different lengths of symbols.

While various embodiments have been presented in the context of rotatable magnetic recording media, other forms of storage media can be utilized as well, including optical media, magneto-optical recording media, HAMR media, microwave assisted magnetic recording (MAMR) media, multi-dimensional media, etc.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

The invention claimed is:

1. A method, comprising:
    generating a sequence of symbols to describe a set of write data, the symbols having a length of nT, where T is a channel clock rate and n is an integer over a predetermined range;
    applying bi-directional write currents to a write pole to record the sequence of symbols to a magnetic storage medium, the write pole having an effective footprint with a downtrack length of mT, where m is an integer, the write currents switching between a first rail current and a second rail current for alternating symbols, the write currents further transitioning to an intermediate current value for at least one channel clock period for symbols longer than 1T; and
    applying write currents to the write pole when recording symbols having a length longer than mT to the medium using the effective footprint of the write pole as an interval.

2. The method of claim 1, comprising measuring the effective footprint of the write pole.

3. The method of claim 1, wherein applying the write currents comprises:
    applying write currents to the write pole according to a first write scheme for a symbol having a length of 1T;
    applying write currents to the write pole according to a second write scheme for a symbol having a length of 2T to the effective footprint; and
    applying write currents to the write pole according to a third write scheme for a symbol having a length greater than the effective footprint.

4. The method of claim 1, wherein the intermediate current value is applied at least to the last m−1 bits for each symbol having a length longer than mT.

5. The method of claim 1, wherein, for each symbol having a length from 2T to the effective write pole footprint:
    applying a write current to the write pole only at a $1^{st}$ T of the symbol; and
    applying the intermediate current value after the $1^{st}$ T of the symbol.

6. The method of claim 1, wherein, for each symbol having a length greater than the effective write pole footprint (EWPF):
    determining a quotient by dividing the symbol length by the EWPF and rounding down the quotient;
    determining a remainder by subtracting the EWPF or a multiple of the EWPF from the symbol length; and
    applying a write current to the write pole at a $1^{st}$ T of the symbol;

applying a write current to the write pole at a predetermined T of the symbol, wherein the predetermined T of the symbol is based on the remainder and the quotient.

7. The method of claim 1, wherein, for each symbol having a length greater than the effective write pole footprint (EWPF):
   determining a quotient by dividing the symbol length by the EWPF and rounding down the quotient;
   determining a remainder by subtracting the EWPF or a multiple of the EWPF from the symbol length;
   applying a write current (WC) plus an overshoot (OS) to the write pole at a $1^{st}$ T of the symbol;
   if the remainder=1, applying WC at a (1+(quotient−1)*EWPF+remainder)T; and
   if the remainder>1, applying WC+OS at a (1+(quotient−1)*EWPF+remainder)T.

8. The method of claim 1, wherein, for each symbol having a length greater than the effective write pole footprint (EWPF):
   determining a quotient by dividing the symbol length by the EWPF and rounding down the quotient;
   determining a remainder by subtracting the EWPF or a multiple of the EWPF from the symbol length;
   applying a write current (WC) plus an overshoot (OS) to the write pole at a $1^{st}$ T of the symbol; and
   applying WC from (1+(quotient−1)*EWPF+1)T to (1+(quotient−1)*EWPF+remainder)T.

9. The method of claim 1, wherein applying the bi-directional write currents to record a selected symbol having a length greater than the effective footprint further comprises:
   writing a selected symbol to the medium by switching to a selected one of the first and second rail currents at a $1^{st}$ T of the selected symbol;
   applying the intermediate current value starting at a $2^{nd}$ T of the selected symbol;
   resuming application of the selected one of the first and second rail currents after applying the intermediate current value; and
   resuming application of the intermediate current value at an ending portion of the selected symbol prior to switching to the other of the first and second rail currents at a next symbol boundary, the ending portion having a length equal to (m−1)T.

10. The method of claim 1, wherein the first rail current is greater than 0 mA, the second rail current is less than 0 mA, and the intermediate current value is nominally 0 mA.

11. An apparatus, comprising:
   a magnetic recording medium;
   a write pole controllably positionable adjacent the medium to write data thereto, the write pole having an effective footprint with a downtrack length of mT, where m is an integer;
   a channel circuit configured to generate a sequence of symbols having a length of nT, where T is a channel clock rate and n is an integer over a predetermined range; and
   a write driver configured to apply bi-directional write currents to the write pole to record the sequence of symbols to the medium, the write currents switching between a first rail current and a second rail current for alternating symbols, the write currents further transitioning to an intermediate current value between the first and second rail currents for at least one channel clock period for symbols longer than 1T, the writer driver further configured to use the effective footprint of the write pole as an interval for applying write currents to the write pole when recording symbols having a length longer than mT to the medium.

12. The apparatus of claim 11, comprising circuitry configured to measure the effective footprint of the write pole.

13. The apparatus of claim 11, wherein the writer driver is configured to:
   apply write currents to the write pole according to a first write scheme for a symbol having a length of 1T;
   apply write currents to the write pole according to a second write scheme for a symbol having a length of 2T to the effective footprint; and
   apply write currents to the write pole according to a third write scheme for a symbol having a length greater than the effective footprint.

14. The apparatus of claim 11, wherein the writer driver is configured to apply the intermediate current value at least to the last m−1 bits for each symbol having a length longer than mT.

15. The apparatus of claim 11, wherein, for each symbol having a length from 2T to the effective write pole footprint, the writer driver is configured to:
   apply a write current to the write pole only at a $1^{st}$ T of the symbol; and
   apply the intermediate current value after the $1^{st}$ T of the symbol.

16. The apparatus of claim 11, wherein, for each symbol having a length greater than the effective write pole footprint (EWPF):
   circuitry is configured to determine a quotient by dividing the symbol length by the EWPF and rounding down the quotient, the circuitry further configured to determine a remainder by subtracting the EWPF or a multiple of the EWPF from the symbol length;
   the writer driver is configured to apply a write current to the write pole at a $1^{st}$ T of the symbol; and
   the writer driver is configured to apply a write current to the write pole at a predetermined T of the symbol, wherein the predetermined T of the symbol is based on the remainder and the quotient.

17. The apparatus of claim 11, wherein, for each symbol having a length greater than the effective write pole footprint (EWPF):
   circuitry is configured to determine a quotient by dividing the symbol length by the EWPF and rounding down the quotient, the circuitry further configured to determine a remainder by subtracting the EWPF or a multiple of the EWPF from the symbol length;
   the writer driver is configured to apply a write current (WC) plus an overshoot (OS) to the write pole at a $1^{st}$ T of the symbol;
   if the remainder=1, the writer driver is configured to apply WC at a (1+(quotient−1)*EWPF+remainder)T; and
   if the remainder>1, the writer driver is configured to apply WC+OS at a (1+(quotient−1)*EWPF+remainder)T.

18. The apparatus of claim 11, wherein, for each symbol having a length greater than the effective write pole footprint (EWPF):
   circuitry is configured to determine a quotient by dividing the symbol length by the EWPF and rounding down the quotient, the circuitry further configured to determine a remainder by subtracting the EWPF or a multiple of the EWPF from the symbol length;
   the writer driver is configured to apply a write current (WC) plus an overshoot (OS) to the write pole at a $1^{st}$ T of the symbol; and the writer drive is configured to apply WC from $(1+(\text{quotient}-1)*\text{EWPF}+1)T$ to $(1+(\text{quotient}-1)*\text{EWPF}+\text{remainder})T$.

19. The apparatus of claim 11, wherein the writer driver is configured to:
- write a selected symbol to the medium by switching to a selected one of the first and second rail currents at a $1^{st}$ T of the selected symbol;
- apply the intermediate current value starting at a $2^{nd}$ T of the selected symbol;
- resume application of the selected one of the first and second rail currents after applying the intermediate current value; and
- resume application of the intermediate current value at an ending portion of the selected symbol prior to switching to the other of the first and second rail currents at a next symbol boundary, the ending portion having a length equal to $(m-1)T$.

20. The apparatus of claim 11, wherein the first rail current is greater than 0 mA, the second rail current is less than 0 mA, and the intermediate current value is nominally 0 mA.

\* \* \* \* \*